(12) United States Patent
Real

(10) Patent No.: US 6,493,243 B1
(45) Date of Patent: Dec. 10, 2002

(54) REDUNDANT POWER SYSTEM AND POWER SUPPLY THEREFOR

(75) Inventor: Richmond Andrew Real, Gilbert, AZ (US)

(73) Assignee: Acme Electric Corporation, East Aurora, NY (US)

( * ) Notice: Subject to any disclaimer, the term of this patent is extended or adjusted under 35 U.S.C. 154(b) by 0 days.

(21) Appl. No.: 10/057,713

(22) Filed: Jan. 25, 2002

Related U.S. Application Data

(63) Continuation-in-part of application No. 09/619,747, filed on Jul. 19, 2000, now Pat. No. 6,359,794.
(60) Provisional application No. 60/167,485, filed on Dec. 1, 1999.

(51) Int. Cl.[7] ............................. H02M 3/335; H02J 7/00
(52) U.S. Cl. ........................................... 363/17; 307/66
(58) Field of Search ............................... 363/17, 19, 20, 363/72, 80, 81, 56, 53, 60; 307/66, 53, 55, 58, 82, 44, 48

(56) References Cited

U.S. PATENT DOCUMENTS

| | | | |
|---|---|---|---|
| 4,405,976 A | * | 9/1983 | Mitchell et al. ............... 363/72 |
| 4,538,073 A | | 8/1985 | Freige et al. |
| 4,734,844 A | | 3/1988 | Rhoads |
| 4,748,340 A | * | 5/1988 | Schmidt ...................... 307/53 |
| 4,886,981 A | | 12/1989 | Lentini et al. |
| 5,122,726 A | | 6/1992 | Elliott et al. |
| 5,191,520 A | * | 3/1993 | Eckersley ..................... 363/72 |
| 5,646,463 A | * | 7/1997 | Mandelcorn ................ 307/127 |
| 5,757,634 A | | 5/1998 | Ferens |
| 5,901,057 A | | 5/1999 | Brand et al. |
| 5,982,652 A | | 11/1999 | Simonelli et al. |
| 6,127,879 A | | 10/2000 | Willis et al. |
| 6,141,231 A | | 10/2000 | Brkovic |
| 6,201,319 B1 | | 3/2001 | Simonelli et al. |

* cited by examiner

*Primary Examiner*—Rajnikant B. Patel
(74) *Attorney, Agent, or Firm*—Pearne & Gordon LLP

(57) ABSTRACT

A redundant power system includes plural load-sharing power supplies connected to a common AC output bus. Identical circuitry is provided in each supply to control the redundant operation and is connected to each of the others via a common redundancy bus. An arbitration circuit in each supply selects a master power supply based on which supply detects the lack of a master supply first via the redundancy bus. A synchronization circuit in each slave supply synchronizes the polarity of the respective AC output with that of the master supply via the redundancy bus. A redundant bias circuit in each supply provides operating power to the redundancy circuitry in the respective supply from a common bulk voltage provided on the redundancy bus. A soft-start circuit in each supply allows all the supplies to start producing power at the AC output bus in unison. An overvoltage correction circuit in each supply detects an overvoltage on the AC output bus and shuts down only the supply which is causing the overvoltage.

30 Claims, 13 Drawing Sheets the arbitration logic senses a master-present signal on the master bus and the local master/slave status is not set to master, then the arbitration logic sets the local master/slave status to slave.

REDUNDANT POWER SYSTEM AND POWER SUPPLY THEREFOR

This application is a continuation-in-part of U.S. Application Ser. No. 09/619,747, filed Jul. 19, 2000 now U.S. Pat. No. 6,359,794 which claims benefit of Provisional Application Ser. No. 60/167,485 filed Dec. 1, 1999.

BACKGROUND OF THE INVENTION

1. Field of the Invention

This invention relates generally to the field of power supplies and specifically to a load-sharing redundant power system.

2. Relevant Art

Power supplies are used in many mission critical applications where it is desirable to continue to provide operating power to certain electrical and electronic systems even in the event of a utility power outage or power supply failure.

An uninterruptible power supply (UPS) system provides backup power-for the protected system from a battery source that is charged by the utility power. It is desirable to utilize an efficient connection from the battery to the load when the utility power is not available. Power management is often part of the UPS system operation.

UPSs are used in many different applications, some of which demand particular output power waveforms from the UPS. Therefore, it is advantageous for a UPS to have a configurable output waveform. It is also advantageous for the UPS to operate from a wide variety of input voltages and frequencies.

When a single UPS is used, there is still a possibility that the UPS could fail and leave the application without power. Thus, in mission critical applications, such as telecommunications, it is desirable to redundantly operate several UPSs or other power supplies connected together to provide power to the same load or system.

Such a redundant power scheme is often referred to as "load sharing." If one of the power supplies operating redundantly fails or must be otherwise shutdown, the remaining redundant supply or supplies continue to supply power to the load.

Such redundant, load-sharing power supplies should have their outputs synchronized so that the desired waveform is supplied to the load and so that the power supplies do not damage one another or the load.

SUMMARY OF THE INVENTION

The present invention provides a redundant power system comprising a plurality of power supplies each connected to a common master-present bus and a common AC output bus. The plurality of power supplies each comprise an AC output connected to the common AC output bus.

Each power supply further comprises a redundant circuit for redundantly operating the power supply in cooperation with the respective redundant circuits of each of the other power supplies, the redundant circuit operating as determined by a local master/slave status as one of a master and a slave.

Each power supply further comprises arbitration logic in communication with the common master-present bus, wherein if the arbitration logic senses a master-not-present signal on the common master-present bus, then the arbitration logic sets the local master/slave status to master and transmits a master-present signal to the common master-present bus node, and wherein if the arbitration logic senses a master-present signal on the master bus and the local master/slave status is not set to master, then the arbitration logic sets the local master/slave status to slave.

According to a further aspect, the present invention provides a redundant power system comprising a plurality of power supplies each connected to a common polarity bus. The plurality of power supplies each comprises a local master/slave status settable to one of master and slave, and a synchronization circuit which reads a polarity value from the common polarity bus and if the local master/slave status is set to master, then the synchronization circuit transmits a master polarity signal to the common polarity bus. Each power supply further comprises a power section comprising an AC output and a polarity control connected to set the polarity of the AC output according to the polarity value of the common polarity bus.

According to a still further aspect, the present invention provides a redundant power system comprising a plurality of power supplies each connected to a common bias bus. The plurality of power supplies each comprises a redundant circuit for cooperation with a corresponding redundant circuit of each of the other power supplies and a power section for providing a local bias voltage. Each power supply further comprises a redundant bias circuit for contributing to a common bias voltage at the common bias bus, the redundant bias circuit providing operating power to the redundant circuit.

Each power supply further comprises a bias diode for performing a logical OR operation of the local bias voltage onto the common bias connection, wherein the redundant bias circuit is adapted to provide the operating power to the redundant circuit from the local bias voltage and to alternatively provide the operating power to the redundant circuit from the common bias connection when the local bias voltage is unavailable.

According to yet a further aspect, the present invention provides a power supply for operation in a redundant power system. The power supply comprises a power section comprising an AC output and a start-up cycle. The power supply further comprises a start-ready connection for connection to a corresponding start-ready connection of at least one other power supply. The power supply further comprises a soft-start circuit for transmitting a not-ready signal to the start-ready connection until the start-up cycle has completed, wherein the soft-start circuit disrupts the operation of the AC output until the soft-start circuit senses no not-ready signal at the start-ready connection.

According to yet a still further aspect, the present invention provides a power supply for operation in a redundant power system. The power supply comprises a power section comprising a pulse-width modulation signal and an AC output for connection to a corresponding AC output of at least, one other power supply.

The power supply further comprises an overvoltage detection circuit sensing a peak voltage level of the AC output, wherein the overvoltage detection circuit transmits an overvoltage signal if the peak voltage level exceeds a predetermined peak voltage level. The power supply further comprises a duty-cycle detection circuit sensing a duty cycle level of the pulse-width modulation signal, wherein the duty-cycle detection circuit transmits a maximum-duty-cycle signal when the duty-cycle level of the pulse-width modulation signal exceeds a predetermined maximum duty-cycle level.

The power supply further comprises an overvoltage correction circuit in communication with the overvoltage detection circuit and in communication with the duty-cycle detection circuit, wherein the overvoltage correction circuit disrupts the operation of the AC output when the overvoltage correction circuit detects both the overvoltage signal and the maximum-duty-cycle signal.

DETAILED DESCRIPTION OF THE INVENTION

Figure 1:
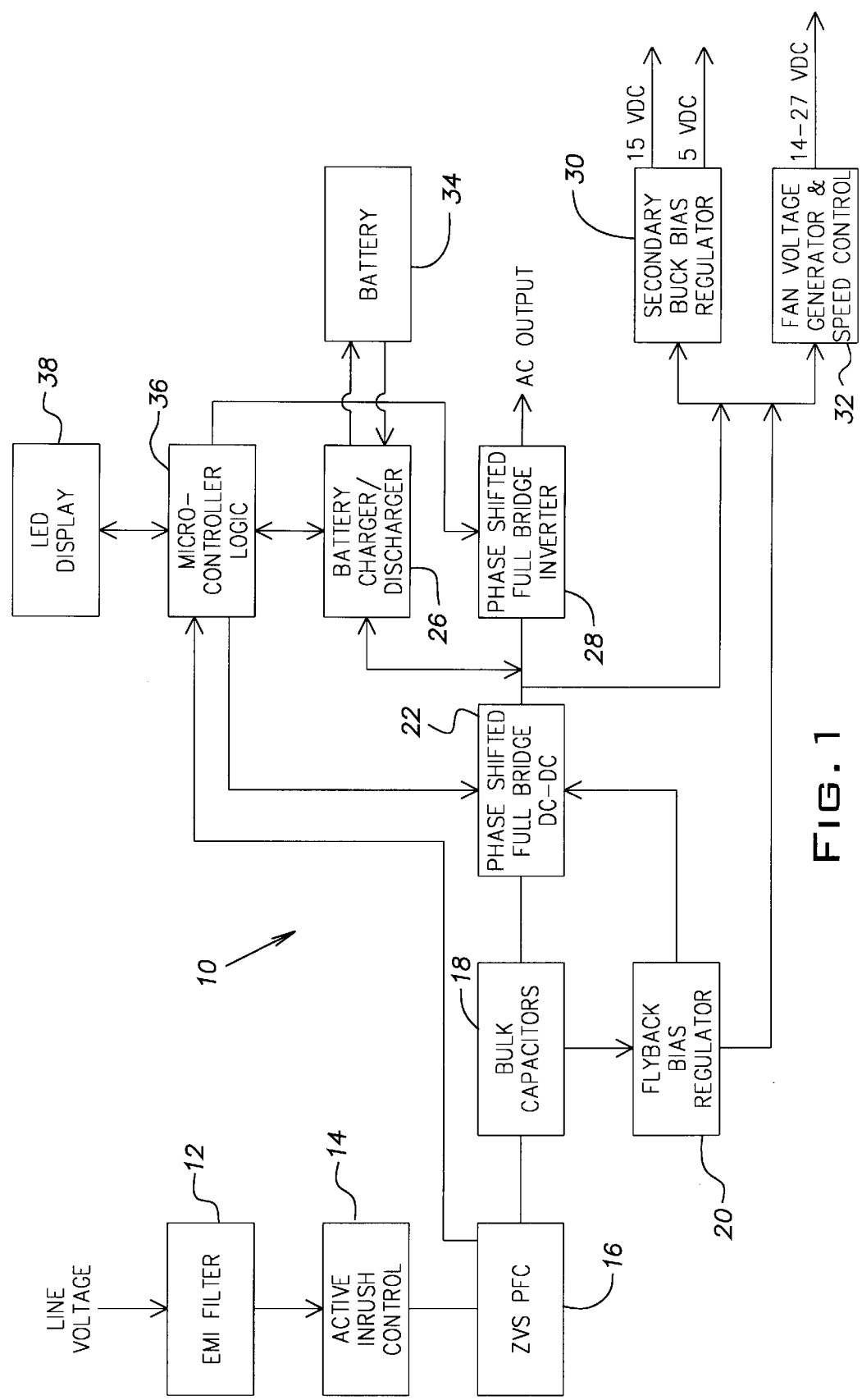
FIG. 1 shows a schematic block diagram of a power supply according to the invention.
Figure 2:
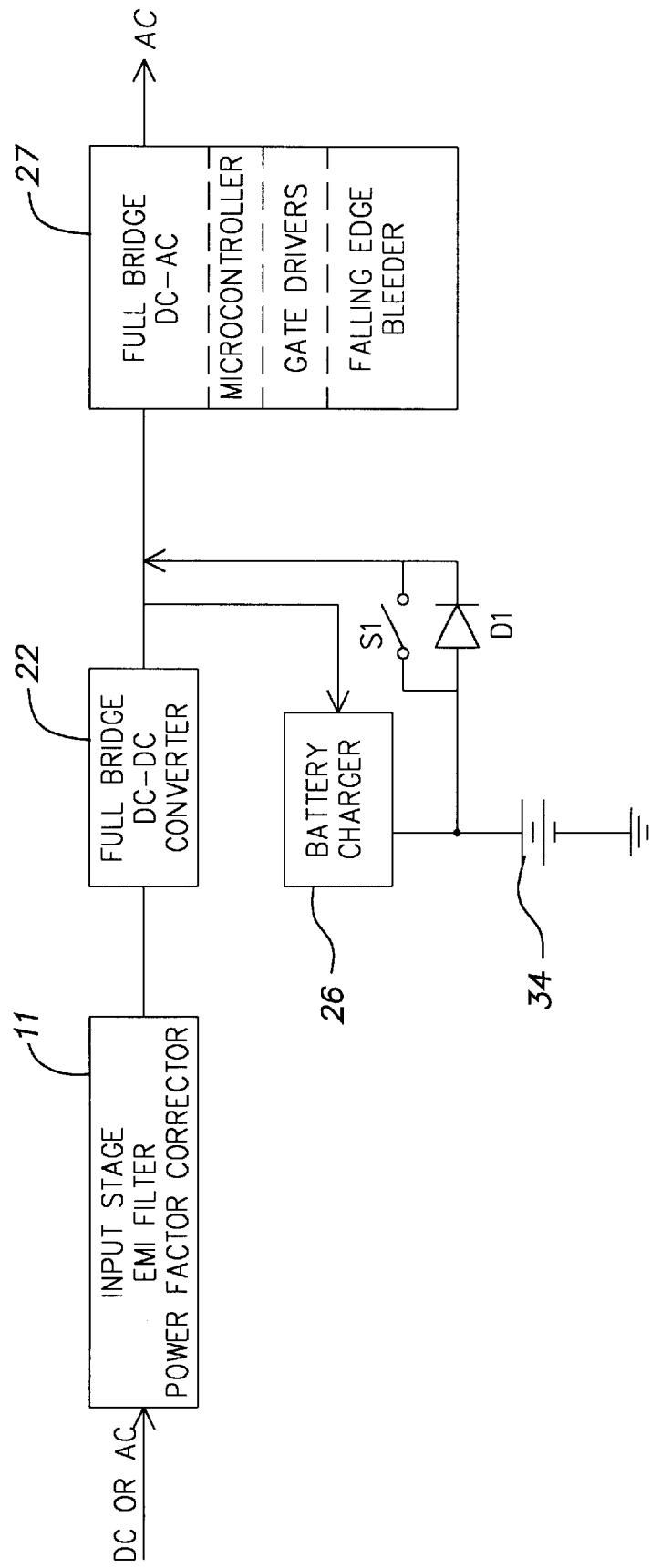
FIG. 2 shows a simplified schematic block diagram of the power supply of FIG. 1.

Referring to FIGS. 1 and 2, a power supply 10 according to the invention is provided with line voltage from any suitable source. Most commonly, line voltage will be 120 VAC at 60 Hz from a commercial utility. The line voltage can, however, range from 85 to 264 VAC at any frequency from DC to 400 Hz. The line voltage is input to an input stage 11 of the power supply. The input stage includes an EMI filter 12. A resistor/relay active inrush control 14 at the EMI filter output prevents excessive current inrush to the power supply. The active inrush control 14 includes a resistor and relay connected in parallel. A high efficiency zero voltage switching (ZVS) power factor corrector (PFC) 16 boosts the line voltage to a desired DC bulk power voltage. The DC bulk power is a DC voltage with an AC ripple. For cable telecommunications amplifiers, the DC bulk power is nominally 400 VDC. The PFC presents a 0.99 or better power factor at full load to the power line. The PFC senses line voltage and shapes the input current to match it. The PFC supports the DC bulk voltage through limited brownouts. If the AC line voltage is lost or drops too low for too long, the PFC 16 sends a signal indicating an insufficient line voltage condition.

The DC bulk power is supported by electrolytic bulk:capacitors 18. After the bulk capacitors 18 are charged through the inrush control 14 resistor, the inrush control relay is closed to short circuit the resistor. A flyback bias regulator 20 runs off of the DC bulk power, and provides initial bias required to start the power supply. A phase shifted full bridge (PSFB) converter 22 converts the DC bulk power to an inverter bulk power. The inverter bulk power can be maintained at any desired voltage. For cable telecommunications amplifiers, the inverter bulk power is regulated to a constant 59 VDC by the converter 22. Under battery power, the inverter bulk power is normally maintained a range of 40–60 VDC. This converter provides full isolation to meet UL, CSA, and TUV requirements for an outdoor environment. The inverter bulk power feeds four sections: a battery charger/discharger 26, an inverter section 27 including a phase shifted full bridge inverter 28, a secondary bias regulator 30, and a fan voltage generator & speed controller 32. The bias regulators 20, 30 and fan voltage generator provide power for various internal control and logic functions.

The battery charger/discharger 26 charges external batteries 34 when the line voltage is adequate and provides power from the batteries to the inverter 28 when the line voltage is inadequate. Current from the battery during discharge flows through a discharge switch S1, such as a FET and its corresponding body diode D1 as shown in FIG. 2. Charging and discharging are controlled by a microcontroller.

The inverter 28 generates an AC waveform having an arbitrary waveform determined by a microcontroller section 36. Power to the inverter can be provided as DC in any of several forms including battery power, rectified AC, or pulse width modulated DC. A falling edge bleeder 37 section is connected across the AC output of the inverter 28.

In the power supply 10, all microcontroller controlled functions can be handled by a single microcontroller or by several microcontrollers dedicated to specific functions of the power supply. In one implementation, two microcontrollers are used. One microcontroller controls the inverter for output wave shaping and controls the battery charger/discharger. Another microcontroller includes user configurable logic for user interface and communication with a variety of transponders used by the cable telecommunications industry. Analog and digital hardware circuitry can also be used to configure system logic. An I2C common serial bus is used by the microcontrollers to communicate with each other and an internal EEPROM memory. An alphanumeric LCD display 38 provides diagnostic and other information about the power supply to a user.

Figure 3A:
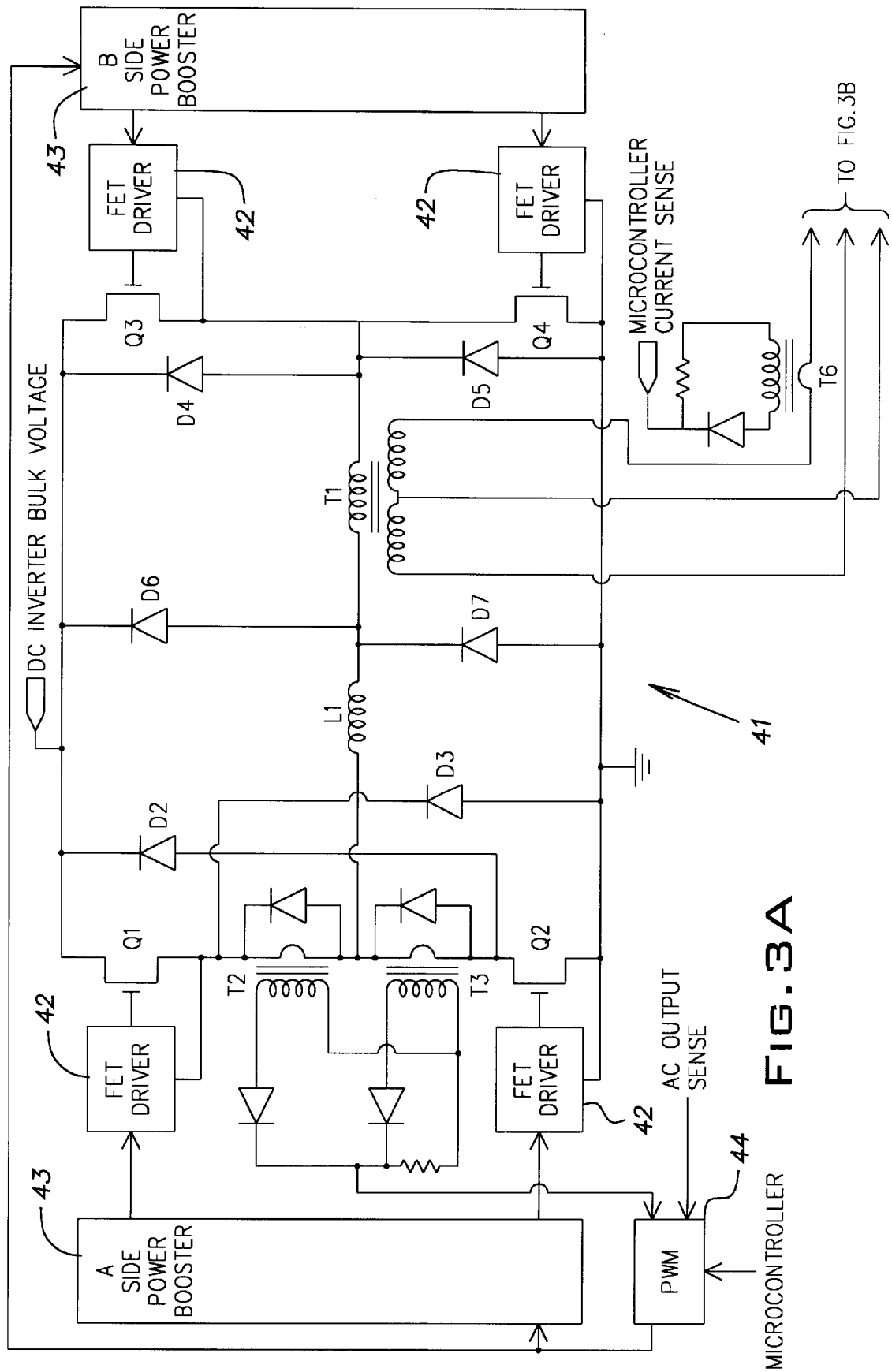
FIG. 3A shows a schematic diagram of the amplitude circuit of the phase shifted, full bridge inverter of the power supply.
Figure 3B:
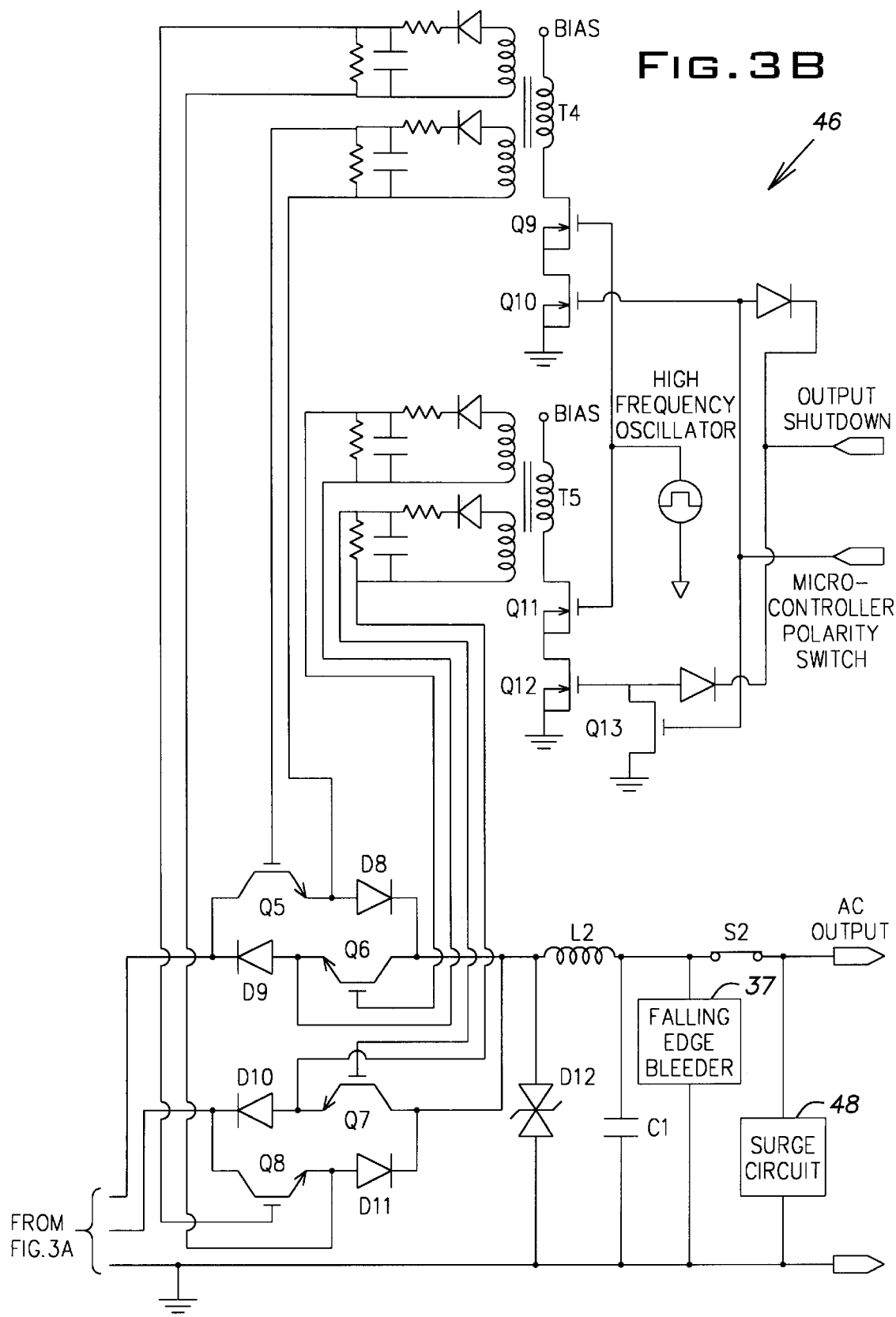
FIG. 3B shows a schematic diagram of the polarity circuit of the phase shifted, full bridge inverter of the power supply.
Figure 4:
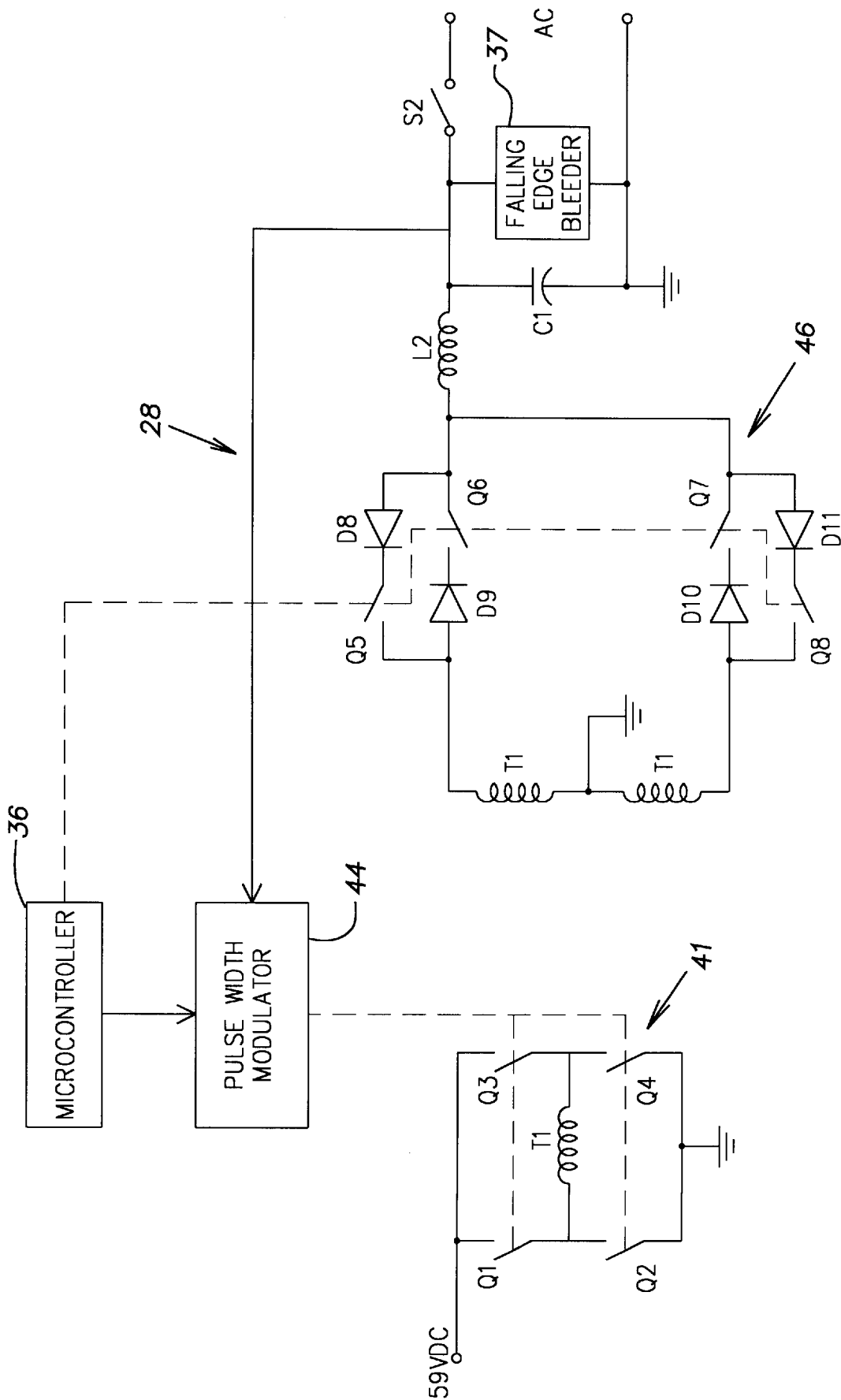
FIG. 4 shows a simplified schematic diagram of the phase shifted, full bridge inverter of FIGS. 3A and 3B.

Referring to FIGS. 3A, 3B, and 4, the inverter 28 includes an amplitude circuit 41 and a polarity circuit 46. The amplitude circuit 41 generates a pulse width modulated output that determines the voltage amplitude of the inverter output. The amplitude circuit includes four FETs Q1–Q4 operated by corresponding FET gate drivers 42. The FET drivers 42 are operated by A side and B side power boosters 43 based on a signal from a pulse width modulator (PWM) 44 controlled by the microcontroller 36. As schematically shown in FIG. 4, the FETs Q1–Q4 are operated as switches.

The drains of the FETs Q1 and Q3 are connected to the inverter bulk power and their respective sources are connected across the primary of a transformer T1. The sources of the FETs Q2 and Q4 are connected to ground and their respective drains are connected across the primary of the transformer T1. In practice, as shown in FIG. 3A, two of the FETs Q1 and Q2 have their sources connected to the transformer T1 through an inductor L1 and respective current sensors T2, T3. The current sensors include respective transformers each having a diode connected in parallel therewith. The current sensors provide inverter current signals to the PWM 44 for analog control. The current signals are used to regulate the inverter and prevent saturation of the transformer T1. If an overcurrent condition is sensed, an alarm is activated. The current signal is also used for operation in a current control mode.

Diodes D2–D5 are connected across each of the FETs Q1–Q4. A diode D6 is connected between the inverter bulk voltage and a node between the transformer T1 and the inductor L1. A diode D7 is connected between ground and the node between the transformer T1 and the inductor L1. The transformer T1 secondary has a center tap connected to ground. The microcontroller 36 generates a reference voltage for the PWM 44. The PWM controls operation of the FETs Q1–Q4 to generate a pulse width modulated output from the transformer T1 output. The energy in the transformer output determines the energy in the AC output of the inverter. Thus, the transformer T1 output determines the absolute value of the power supply output voltage. The PWM 44 senses AC output voltage and compares it to the reference voltage from the microcontroller. The PWM controls the transformer T1 output to obtain the desired voltage amplitude.

A current sensor including a transformer T6 is connected on the secondary side of the transformer T1. The current sensor sends a current signal to the microcontroller for display on the LCD 38 and for internally monitoring the output current on the power supply.

The inverter 28 includes a polarity circuit 46 having polarity switches Q5–Q8 connected between the transformer T1 secondary and the power supply output. The polarity switches Q5–Q8 are NPN insulated gate bipolar transistors. Each polarity switch Q5–Q8 is connected in series with a diode D8–D11. The polarity switch and diode combinations are connected in opposing pairs in respective legs of the transformer T1 output. The AC output of the polarity circuit is connected to a filter including an. inductor L2 and a capacitor C1. The LC filter L2, C1 filters the pulse width modulated output of the amplitude and polarity circuits to provide the desired output waveform.

Two polarity switch control transformers T4 and T5 are each provided with two sets of secondary windings. One leg of each transformer T4, T5 secondary is connected through a diode and an RC filter to the gate of a corresponding one of the polarity switches Q5–Q8. The other leg of the corresponding transformer T4, T5 is connected to the emitter of the respective polarity switch Q5–Q8. A bias voltage is applied to the primary side of the transformer T4, which is connected in series with two FETs Q9 and Q10. The bias voltage is also applied to the primary side of the transformer T5, which is connected in series with two FETs Q11 and Q12. Another FET Q13 is connected between the gate of FET Q12 and ground. The gates of FETs Q9 and Q11 are connected to a high frequency square wave generating oscillator. The gates of FETS Q10 and Q12 are connected to an output of the microcontroller that can provide an output shutdown signal. The output shutdown signal is normally high during operation. The gates of FETs Q10 and Q13 are connected to a polarity switch output of the microcontroller 36.

When the microcontroller 36 sets the AC output to zero, the microcontroller also changes the digital state of its polarity switch output. If it was high, it becomes low. If it was low, it becomes high. This results in either FET Q10 or FET Q12 being on, but not both. The FETs Q9 and Q11 are continuously driven by the high frequency oscillator. Thus, either transformer T4 or transformer T5 is active, but not both. The square waves generated by the transformers T4 and T5 are averaged to a DC level by the corresponding diode and RC filter on each output winding. These DC voltages will turn on either the combination of polarity switches Q5 and Q8 or the combination of polarity switches Q6 and Q7. The corresponding diodes D8–D11 rectify the output of the phase shifted full bridge as either a positive or a negative voltage.

When the output is to be zero volts, FETs Q12 and Q10 are disabled by pulling the output shutdown signal to low, which prevents operation of the transformers T4 and T5. This turns off all of the polarity switches Q5–Q8.

A transorb D12 connected across the AC output dissipates residual energy left in the inductor L2 when transistors Q5–Q8 are all off. The dissipation period can be extended as necessary according to the inductor L2 and filter capacitor C1 values. A disconnect switch S2 is located downstream of the falling edge bleeder 37. A surge circuit 48 absorbs fast electrical transients that could damage downstream circuitry.

Figure 5:
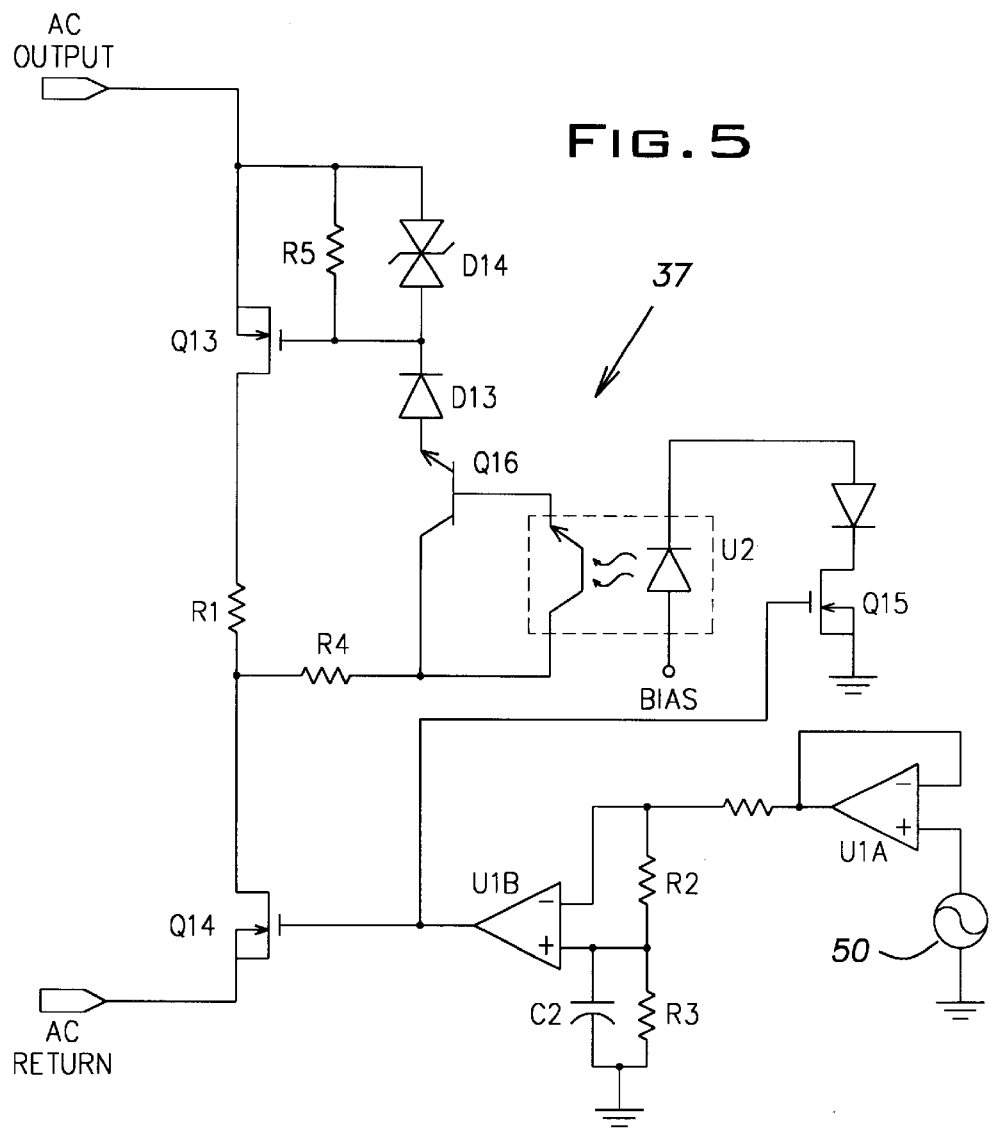
FIG. 5 shows a schematic diagram of the falling edge bleeder of the power supply.

Referring to FIGS. 3B and 5, the falling edge bleeder 37 includes a bleed resistor R1 connected across the AC output of the full bridge converter 28. A pair of FETs Q13, Q14 are connected in series with the bleed resistor R1. A sensing voltage signal 50 representing the desired AC output voltage of the full bridge converter 28 is fed through a buffer U1A to the inverting input of an op amp U1B. The output of the buffer U1A is attenuated by a voltage divider R2, R3 and fed to the non-inverting input of the op amp U1B. A capacitor C2 connected in parallel with the resistor R3 slows the response of the voltage divider R2, R3. The output of the op amp U1B is fed to the gate of the FET Q14 and the gate of another FET Q15. The FET Q15 is connected to the diode of an optocoupler U2. The optocoupler U2 is connected to operate a transistor Q16. The transistor Q16 emitter is connected to the gate of FET Q13 through a diode D13. A 14 volt bipolar transorb D14 is connected between the AC output and the gate of the FET Q13.

If the AC output voltage is controlled to move toward zero at a rate exceeding a maximum rate determined by the voltage divider R2, R3 and the capacitor C2, the output of the operational amplifier U1B output will go high. This turns on the FET Q14. It also turns on the FET Q15, which pulls current through the light emitting diode of the optocoupler U2. If the AC output voltage is positive, current flows through the parasitic body diode of Q13. This places the bleed resistor R1 in parallel with the AC output. The diode D13 prevents current from flowing through the transistor of optocoupler U2 and prevents harmful voltages from being impressed upon the transistor Q16 and the optocoupler U2. If the AC output voltage is negative, then current flows through the FET Q14, a current limiting resistor R4, and the transistor of the optocoupler U2. This turns on the transistor Q16, which feeds a current through the diode D13 and the parallel combination of resistor R5 and the transorb D14. This places a voltage on the gate of the FET Q13 from its gate to its source, which is limited to the breakdown voltage of the bipolar transorb D14. This turns on the FET Q13 and places the bleed resistor R1 in parallel with the AC output. Directing current through the bleed resistor R1 accelerates the movement of the output voltage toward zero to discharge residual energy. This permits the actual output voltage to more closely follow the desired output voltage set by the microcontroller. In many cases, the desired output voltage will ramp toward zero more quickly than the actual voltage during every half cycle. Thus, the falling edge bleeder might be activated every half cycle.

When the AC output voltage begins to rise again, the voltage at the inverting input of the op amp U1B will exceed the time delayed voltage at the non-inverting input. The output of the op amp U1B will go low, which turns off the FETs Q13 and Q14. If the AC output voltage is positive, the full AC output voltage appears across the FET Q14. If the AC output voltage is negative, the full output voltage appears across FET Q13. No current will flow between the AC output and return.

Thus, the amplitude circuit controls output voltage amplitude and the polarity circuit controls output voltage polarity. The falling edge bleeder ensures that a quickly declining output voltage magnitude follows the desired waveform. Frequency is determined by the rate at which the polarity circuit changes the output polarity. Normally, the amplitude circuit ramps the voltage down before polarity is changed. Smoothly synchronized microcontroller operation of the gate drivers and polarity switches generates a precise AC waveform of arbitrary shape at the output of the power supply. For example, to obtain an output waveform having a trapezoidal shape, full voltage is maintained by a relatively high duty-cycle on the amplitude circuit output. The LC filter L2, C1 provides an instantaneous output voltage magnitude corresponding with the pulse width modulated voltage of the amplitude circuit. For 60 Hz operation, the voltage is set to zero and the polarity changed every 1/120th of a second. Before the voltage is set to zero, the duty-cycle of the inverter amplitude circuit is reduced in steps to obtain a downward sloping ramp on the output of the power supply. The falling edge bleeder dissipates energy to ensure that the output voltage decays at the correct rate. After reaching zero, the polarity circuit changes the output polarity. Then, the output voltage is ramped down to full negative voltage by increasing the inverter duty-cycle. Operation continues in this manner to obtain the desired output waveform.

Figure 6:
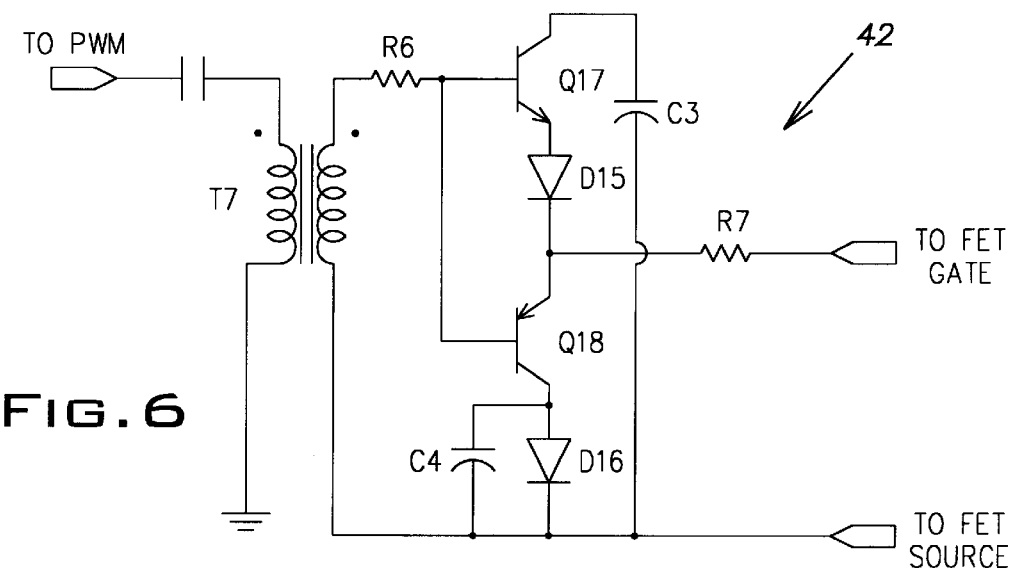
FIG. 6 shows a schematic diagram of the FET gate driver of the power supply.

Referring to FIGS. 3A and 6, each FET driver 42 includes a transformer T7 having its primary connected between the pulse width modulator 44 output (via the corresponding power booster 43) and ground. The input from the PWM 44 is a 50% duty-cycle square wave. The secondary of the transformer T7 is connected through a resistor R6 to the respective bases of two transistors Q17, Q18. One of the transistors Q17 is an NPN type and the other transistor Q18 is a PNP type. The emitter of the NPN transistor Q17 is connected to the gate of the corresponding FET Q1, Q2, Q3, or Q4 through a diode D15 and a resistor R7. The collector of this transistor Q17 is connected to the FET source through a capacitor C3. The emitter of the PNP transistor Q18 is connected to the gate of the corresponding FET through the resistor R7. The collector of this transistor Q18 is connected to the FET source through a capacitor C4 and diode D16 connected in parallel.

The FET driver 42 has two modes of operation: steady state and initial state. During steady state operation, when the voltage across the secondary of transformer T7 goes from negative to positive, the NPN transistor Q17 is forward biased from base to emitter. This pulls current from the capacitor C3 through the transistor Q17, the diode D15, and the resistor R7 to the gate of the FET. Simultaneously, the PNP transistor Q18 is reverse biased from base to emitter and turns off. The FET gate voltage will then rise to the level to which the capacitor C3 is charged. After reaching the voltage of the capacitor C3, the energy removed from the capacitor C3 to charge the FET is restored to the capacitor C3 through the base-collector PN junction in the transistor Q17. Eventually, the transformer T7 reverses polarity again, going from positive to negative. Then, the NPN transistor Q17 is reverse biased from base to emitter and turns off. The PNP transistor Q18 is forward biased from emitter to base. The capacitor C4 is charged to a negative voltage with respect to the FET source. Current flows from the gate of the FET, through the resistor R7 and transistor Q18, and into the capacitor C4. The capacitor C4 becomes slightly less negative in this process. After the FET gate is at its maximum negative voltage, current flows though the collector-base PN junction in the transistor Q18, through the resistor R6 and transformer T7 secondary, and back to the capacitor C4, restoring the capacitor C4 to its previous level of negative voltage. This process then repeats as the polarity of the transformer T7 continues to alternate.

During the initial state mode when the FET driver 42 is started, the capacitors C3 and C4 are completely discharged. When the voltage on the transformer T7 secondary first goes positive, all the charge flowing though the resistor R7 flows from the transformer T7 through the diode D15 and the base-emitter junction of the transistor Q17. This will result in a low rate of rise on the waveform and a slow turn on of the FET as compared to the steady state operation. As the corresponding FET gate slowly charges, the capacitor C3 also charges. All the energy being pulled out of the FET gate flows through the emitter-base junction of Q18, the resistor R6, and the transformer T7 secondary. This results in a slow turn off of the FET. As the FET turns off, the capacitor C4 gradually charges to a negative voltage. Once the capacitors C3 and C4 are both charged to their full normal potential, the circuit works in the steady state mode described above.

Figure 7:
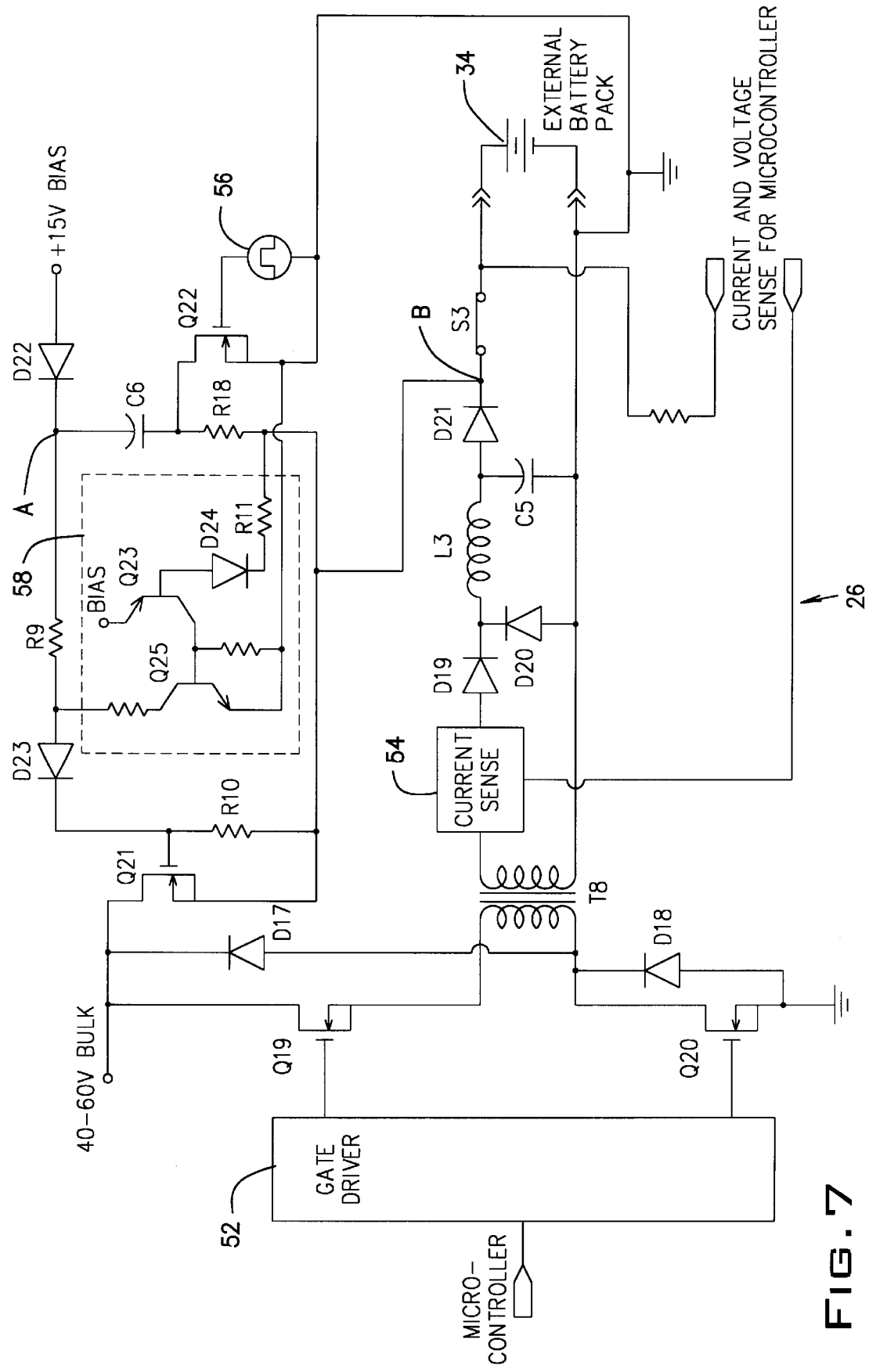
FIG. 7 shows a schematic diagram of the battery charger and discharger of the power supply.

Referring to FIGS. 2 and 7, the battery charger/discharger 26 includes a charging circuit and a discharging circuit. The charging circuit is a forward converter battery charger including two charging FETs Q19, Q20 operated by a microcontroller controlled gate driver 52. The charging FETs Q19, Q20 are connected between the inverter bulk power and ground via the primary of a charging transformer T8. Voltage clamping diodes D17, D18 are connected to the drains of the charging FETs Q19, Q20. A current sensor 54 is connected to the secondary of the charging transformer. The transformer output is rectified by a diode D19 and smoothed by an inductor L3 and capacitor C5. A freewheeling diode D20 and ORing diode D21 are also provided in the charging circuit. The ORing diode D21 prevents current flow into the battery charging circuit when an external battery charger is connected to the battery. A battery disconnect switch S3 is provided to isolate the battery 34 from the charging and discharging circuits. A voltage sensing line is connected from the battery to the microcontroller. This battery charger is capable of charging 36 V or 48 V nominal battery strings at a rate of 10 A. The battery output is normally maintained at about 41 to 54 volts. The microcontroller is connected to receive line voltage information from the power factor corrector. When the power supply loses AC line voltage on the main line, the charger is disabled, and the battery discharge circuit is activated.

The discharging circuit includes discharge FET Q21 connecting the battery to the inverter bulk power through the disconnect switch S3. In FIG. 2, the discharge FET Q21 is schematically shown as the parallel combination of the switch S1 and diode D1. If the inverter bulk drops below the battery voltage, the body diode of discharge FET Q21 will forward bias, thus current will flow from the battery to sustain the inverter bulk voltage.

When the DC bulk voltage is lost or falls too low, the PFC sends a low voltage signal to the microcontroller, which then starts an oscillator 56. The oscillator 56 drives control FET Q22. When the control FET Q22 is on, capacitor C6 is charged to the bias voltage (nominally 15 volts) though diode D22. When the control FET Q22 is off, its drain to source capacitance is charged to the battery voltage via resistor R8. Thus, the voltage at node A is held higher than the battery voltage. Current then flows from the capacitor C6, through resistor R9, and diode D23, into the gate capacitance of the discharge FET Q21. When the control FET Q22 is turned on again, diode D23 prevents the gate of discharge FET Q21 from losing the stored charge immediately. Thus, the discharge FET Q21 is turned on if the failure of the AC line voltage to maintain the inverter bulk voltage is more than a transient condition. The repeated charging and discharging of the capacitor C1 by the oscillator 56 maintains sufficient voltage at the gate of the discharge FET Q21 to hold the discharge FET on.

When the AC line voltage is restored, but before the inverter bulk voltage is supported by the full bridge inverter 22 again, the oscillator 56 is stopped by the microcontroller. The capacitor C6 no longer delivers charge to discharge FET Q21. The voltage on the gate of discharge FET Q21 decays slowly through resistor R10. Once the gate voltage drops below the threshold voltage of discharge FET Q21, the FET turns off and current flow through the discharge FET shifts from the switch S1 to its intrinsic body diode D1. This state continues until the power supply is fully restored to normal operation so the inverter bulk voltage exceeds the battery voltage. Thus, the body diode is reverse biased and there is no current flow through the discharge FET Q21. The battery charger is then restarted, and normal operation commences.

The battery discharger is provided with a protection circuit 58. If the output of the battery charger, node B, for example, is shorted out, the voltage at the battery output will drop below a protection circuit bias voltage. When this occurs, current flows through transistor Q23 from its emitter to its base. The base current flows through diode D24 and resistor R11 to the battery output. This will feed current into transistor Q25, which pulls the anode of diode D23 to ground. This holds the discharge FET Q21 off in a short circuit condition and prevents current from the inverter bulk voltage from flowing into the short circuit. Diode D24 prevents damage to transistor Q23 under normal operating conditions.

Figure 8:
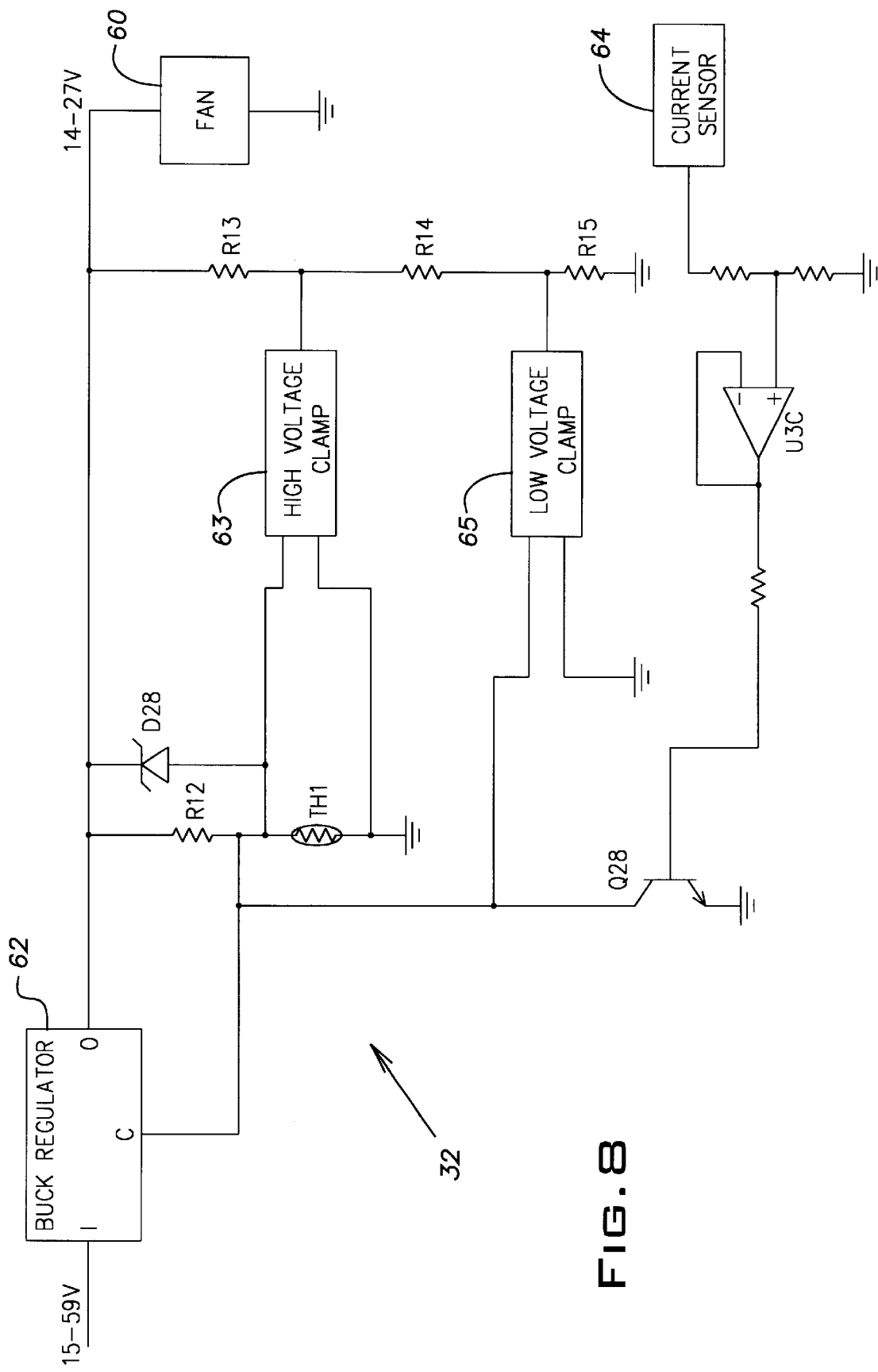
FIG. 8 shows a schematic diagram of the fan voltage regulator and speed control of the power supply.

Referring to FIG. 8, the fan controller 32 operates a cooling fan 60 for the power supply. The fan controller 32 includes a buck regulator 62 used to set a fan voltage in a range of 14 to 27 VDC. Voltage at the output O of the regulator 62 is fed back to the control input C through a resistor R12. A negative temperature coefficient, temperature dependent resistor, such as a thermistor TH1, is connected between the control input C and ground. The thermistor TH1 monitors power supply temperature. As the power supply temperature increases, the resistance of the thermistor TH1 decreases. This pulls down the voltage at the regulator control input C, which causes the regulator to increase the voltage to the fan. Thus, as the power supply temperature increases, the fan speed increases. Similarly, as the power supply temperature decreases, the fan speed decreases.

High voltage and low voltage clamps 63, 65 clamp the regulator output voltage within upper and lower limits, respectively. If the output voltage exceeds a threshold determined by resistors R13, R14 and R15, then the high voltage clamp 63 feeds current into the thermistor TH1, which maintains the regulator control input voltage at a level clamping the regulator output voltage to the high rail (27 VDC). If the output voltage drops below a threshold determined by the resistors R13, R14, and R15, then the low voltage clamp 65 pulls current away from the thermistor TH1, which holds the regulator control voltage at a level maintaining a minimum output voltage.

A current sensor 64 is connected to sense output current of the power supply. A low pass filter U3C buffers an analog representation of the output current from the current sensor. The LP filter U3C feeds the current signal into transistor Q28. If the power supply current increases, representing increased load, the transistor Q28 reduces the voltage at the regulator control. This increases the regulator output voltage and increases the fan speed. If the power supply current decreases, representing decreased load, the transistor Q28 raises the voltage at the regulator control. This decreases the regulator output voltage and decreases the fan speed.

A zener diode D28 is an overvoltage protection diode. If the regulator output voltage exceeds the breakdown voltage of diode D28 plus the voltage across the thermistor TH1, then the diode D28 will conduct, which clamps the output voltage.

Figure 9:
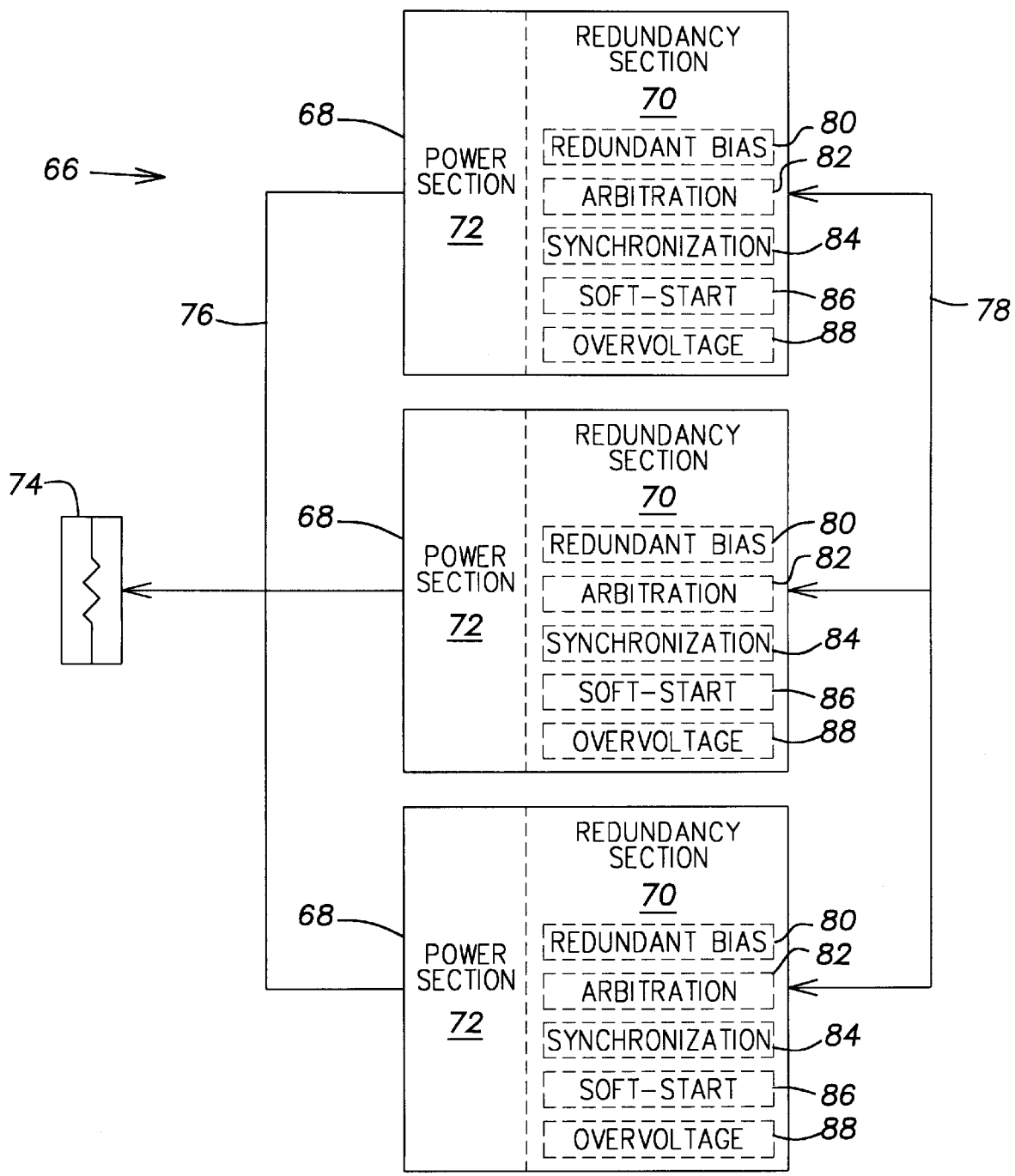
FIG. 9 shows a schematic block diagram of a redundant power system according to the invention.

Referring to FIG. 9 a redundant power system 66 is shown comprising redundant power supplies 68. Each redundant supply 68 has a redundancy section 70 and a power section 72. As used herein, except where otherwise specified, the terms "local" and "unit" will generally refer to an element of a redundant supply 68 which operates independently of the other redundant supplies 68 in the power system 66, and the term "common" will generally refer to an element of the redundant power system 66 which is shared or interconnected between two or more redundant supplies 68.

The power sections 72 of each of the redundant power supplies 68 are connected together to share a common load 74 by way of a common AC output bus 76. Likewise, the redundancy sections 70 of each of the redundant supplies 68 are connected together for intercommunication by a redundancy bus 78. The redundancy bus 78 comprises a plurality of individual buses connected respectively between various matching circuits of the redundancy sections 70 of each of the redundant supplies 68. These elements of the redundancy sections 70 will be enumerated and described in detail below.

While three redundant supplies 68 are shown in FIG. 9 by way of example. The present invention anticipates that more or less power supplies can be used as required for a given application. Additional redundant supplies 68 are added by-connecting their redundancy sections 70 and power sections 72 to the redundancy bus 78 and common AC output bus 76, respectively. Further, as will become apparent, a single redundant supply 68 according to the present invention is capable operating as a stand-alone power supply without the connection of additional redundant supplies 68.

In the present embodiment, the power section 72 of each redundant supply 68 includes a PWM and a polarity circuit and produces an AC output, such as the power supply 10 disclosed herein. However, it will become apparent from the disclosure that other power sections of different design may be substituted for the power section 72 in the redundant power system 66 without departing from the scope of the present invention.

Figure 10A:
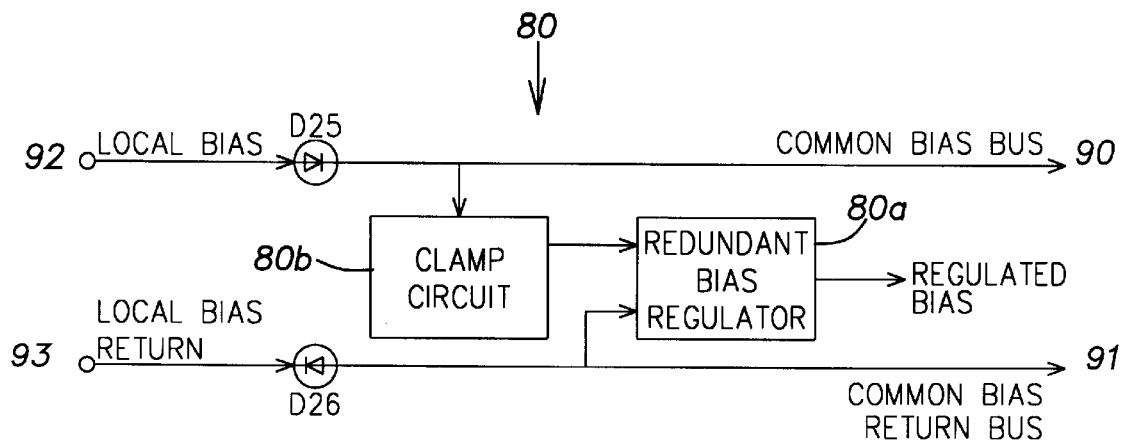
FIG. 10A shows a schematic block diagram of a redundant bias circuit of a redundant power supply in the redundant power system.
Figure 10C:
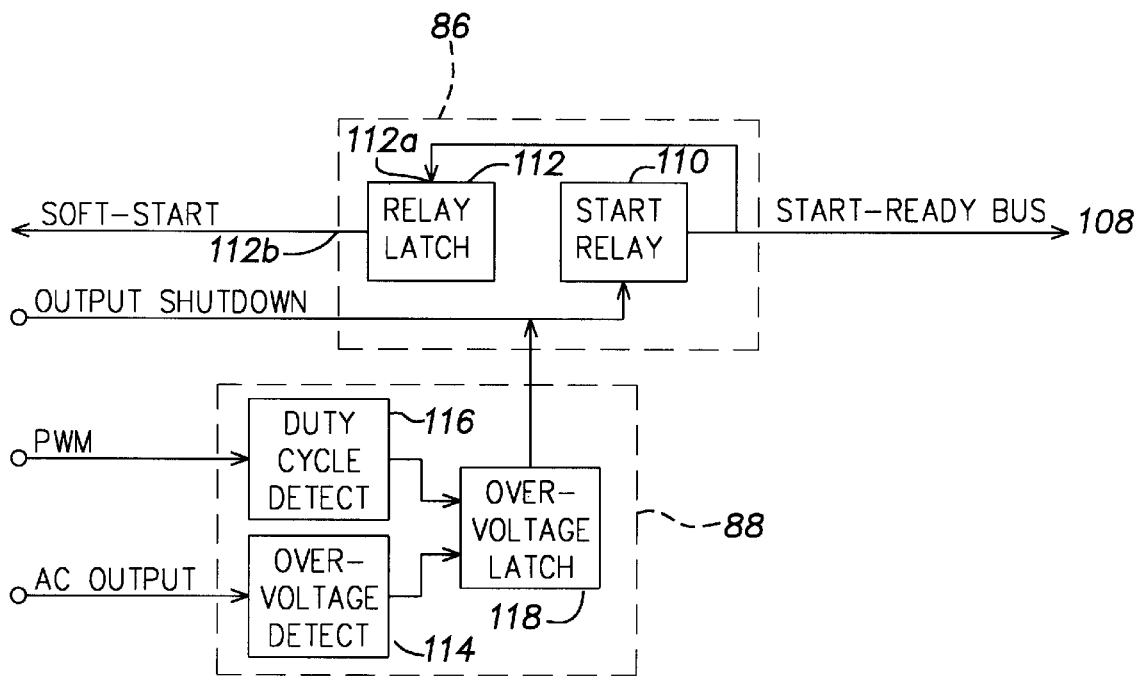
FIG. 10C shows a schematic block diagram of soft-start and overvoltage correction circuits of a redundant power supply in the redundant power system.
Figure 10B:
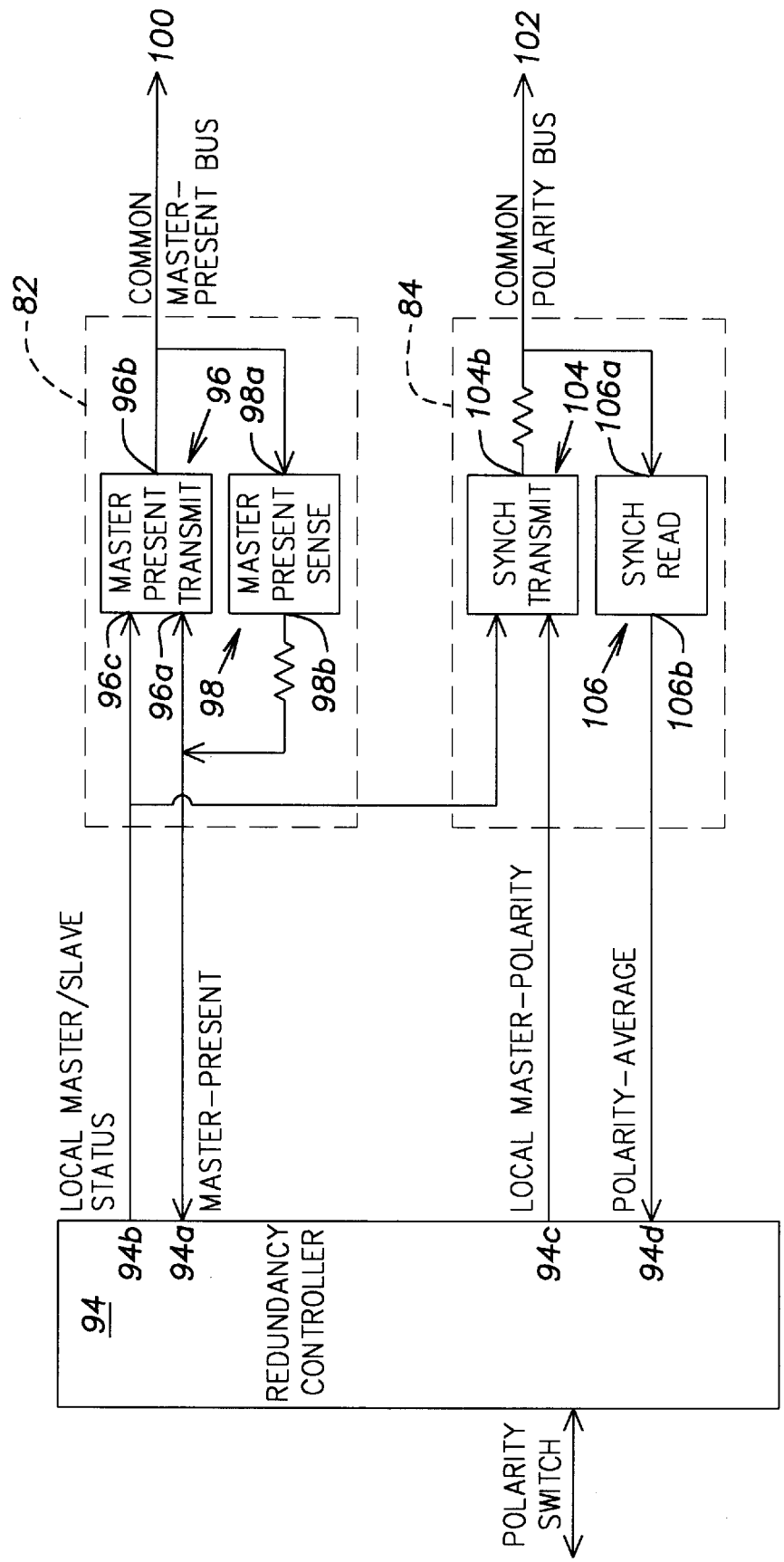
FIG. 10B shows a schematic block diagram of arbitration and synchronization circuits of a redundant power supply in the redundant power system.

Referring to FIGS. 10A, 10B and 10c, the basic elements of operation of the redundancy section 70 (see FIG. 9) are shown. Each redundancy section 70 comprises five redundant circuits: a redundant bias circuit 80, an arbitration circuit 82, a synchronization circuit 84, a soft-start circuit 86, and an overvoltage correction circuit 88. Since each redundant supply 68 in the redundant power system 66 (see FIG. 9) contains each of the redundant circuits 80–88 in its respective redundancy section 70, the redundant circuits 80–88 in one redundant supply 68 interact with the redundant circuits 80–88 in each of the other redundant supplies 68 that are running redundantly.

Referring to FIGS. 9 and 10A, a common bulk voltage is provided to redundantly supply operating power to the redundancy section 70 of each 68 by way of its redundant bias circuit 80 and a common bias bus 90 of the redundancy bus 78. The common bias bus 90 is referenced to a common bias return bus or common ground 91 and supplies the common bulk voltage to each of the redundancy sections 70.

Each redundant bias circuit 80 is connected to receive a local bias voltage 92 from its respective power section 72. For example, the power supply 10 described herein could provide a bias voltage to the respective redundant bias circuit 80 from its secondary bias regulator 30 (see FIG. 1).

Further, when the respective power section 72 is operating correctly, each redundant bias circuit can provide the common bulk voltage to the common bias bus 90. In the event that one or more of the redundant supplies 68 fails, the remaining functioning redundant supplies 68, if any, will continue to maintain the common bulk voltage on the common bias bus 90 to provide operating power to the redundancy sections 70 of all of the connected redundant supplies 68. The redundant bias circuit 80 of each redundant supply 68 generates it's own regulated bias voltage from the common bulk voltage of the common bias bus 90, thus providing a regulated bias voltage to other redundancy circuits of the redundancy section 70, including the arbitration circuit 82 and the synchronization circuit 84, even when the respective power section 72 is not functioning. Further, it is contemplated within the scope of the present invention that the redundant bias circuit 80 can be used to power additional circuits of the redundant power supply 68, as needed.

Specifically, in the redundant power system 66, a bias diode D25 in each of the bias circuits 80 performs a logical OR of their respective local bias voltage 92 onto the common bias bus 90. Thus, if at least one of the bias circuits 80 is delivering its local bias voltage 92 to the common bias bus 90, then the common bias bus 90 can provide the regulated bias voltage to the other redundancy circuits 82, 84 of every redundant supply in the power system 66.

Each of the local bias voltages 92 is referenced to a respective local bias ground or return 93. A bias return diode D26 separates the local bias return (ground) 93 of each redundant bias circuit 80 and the common bias return 91. The redundant bias circuit 80 further comprises a redundant bias regulator 80a and a bias clamp circuit 80b to provide a regulated bias voltage 80c to each of the other redundancy circuits 82, 84. The redundant bias regulator 80a is referenced to the common bias return bus (ground) 91 and is connected to the common bias bus 90 through the clamp circuit 80b. The clamp circuit 80b protects the bias regulator 80a from excessive voltages.

Figure 11:
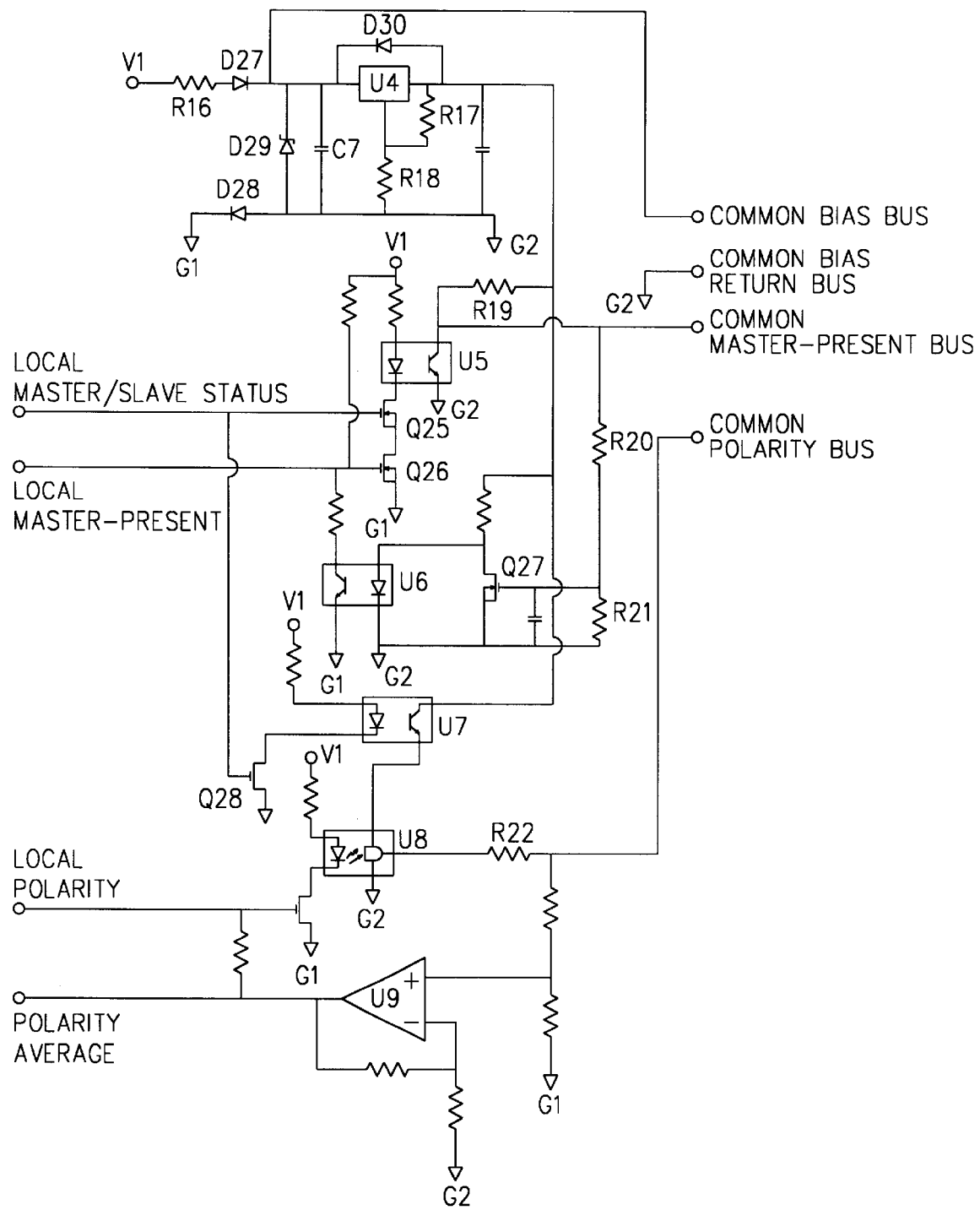
FIG. 11 shows a schematic diagram of an embodiment of the redundant bias circuit of FIG. 10A and the arbitration and synchronization circuits of FIG. 10B.

FIG. 11 shows a circuit which includes an example of an embodiment of the redundant bias circuit 80 (see FIG. 10A) of the redundant power supply 68 according to the present invention. Specifically, a diode D27 ORs in a local bias voltage V1 that is referenced to the local bias return or local power supply ground G1. An isolation diode D28 separates the local power supply ground G1 from the common bias return or common ground G2. A zener diode D29 clamps the ORed voltage. In the event that a connection opens up, the zener diode D29 prevents voltages from rising too high for the input of U4. Capacitor C7 provides local capacitance for U4. The voltage across D29 is to the common bias and common bias return buses.

Protection diode D30 prevents reverse voltages from damaging U4. Regulator U4, resistor R17 and resistor R18 define the regulated bias voltage that powers the redundancy circuitry. Thus, each power supply generates its own regulated bias voltage from the common bulk voltage on the common bias bus.

Referring to FIGS. 9 and 10B, a redundancy controller 94, such as a microcontroller, is provided in the redundancy section 70 of each redundant supply 68. The redundancy controller 94 implements logic to control the operation of various aspects of the redundancy section 70 and the power section 72 according the redundant power system 66 disclosed herein. Further, operating power can be provided to the redundancy controller 94 by the redundant bias circuit 80.

Further regarding the redundancy controller 94, it should be appreciated that, as mentioned above with regard to the microcontroller 36 of the power supply 10, all controller functions of a power supply can be implemented using a single microcontroller or alternatively separate microcontrollers may be provided. Further, as previously mentioned with regard to the power supply 10, other types of controller circuitry may be substituted for the microcontroller(s). Thus, the redundancy controller 94 may be incorporated with other controllers, or provided for separately.

The arbitration circuit 82 in each redundant supply 68 allows two or more redundant supplies 68 to collaboratively decide which supply 68 will operate as the master supply and provide a master synchronization signal to all the slave supplies. Arbitration logic for implementing the functions of the arbitration circuit 82 is embodied in both the arbitration circuit 82 itself and the redundancy controller 94.

Each arbitration circuit 82 comprises a master-present transmit circuit 96 and a master present sense circuit 98. A common master-present bus 100 of the redundancy bus 78 connects each arbitration circuit 82 to the arbitration circuits 82 of the other redundant supplies 68 for communicating a common master-present signal.

Specifically, regarding the arbitration circuit 82 of each redundant supply 68, the common master-present bus 100 is connected to an input of the master-present sense circuit 98. An output of the master-present sense circuit 98 is connected through a resistor to a master-present input/output 94a of the redundancy controller 94. When the master-present input/output (I/O) 94a is functioning as a high impedance input, the master-present sense circuit 98 is capable of relaying a signal from the common master-present bus 100 to the redundancy controller 94 for the purpose of sensing whether any redundant supply 68 in the power system 66 has declared itself as master.

Further, the master-present I/O 94a of the redundancy controller 94 is also connected to an input 96a of the master-present transmit circuit 96. An output 96b of the master-present transmit circuit 96 is connected to the common master-present bus 100. When the master-present input/output (I/O) 94a is functioning as a low impedance output, the master-present transmit circuit 96 is capable of relaying a signal from the redundancy controller 94 to the common master-present bus 100 for controlling the signal of the common master-present bus 100.

Further, a local master/slave status output 94b of the redundancy controller 94 is connected to a control input 96c of the master-present transmit circuit 96 to communicate a local master/slave status of the respective redundant supply 68 from the redundancy controller 94 for control of the operation of the master-present transmit circuit 96.

The operation of the arbitration circuits 82 connected to the common master-present bus 100 in the redundant power system 66 of the present invention is as follows.

At initialization of each redundant supply, the master-present I/O 94a of each controller 94 is set as a high impedance output and the local master/slave status output 94b is set low as a slave. The redundancy section 70 provides a weak pull-up to bias voltage to the respective master-present transmit circuit 96, causing the master-present transmit circuit 96 to set the common master-present bus 100 to a logic high voltage. This logic high voltage on the common master-present bus 100 acts as a "master-not-present" signal, indicating that none of the redundant power supplies 68 have declared themselves as master.

When each master-present sense circuit 98 senses the master-not-present (high) signal on the master-present bus 100 it relays this master-not-present (high) signal to the local master-present I/O 94a of its respective redundancy controller 94. The first redundancy controller 94 in the power system 66 to detect the master-not-present (high) signal at its respective local master-present I/O 94a, declares the respective redundant supply 68 to be a master supply by changing its respective local master/slave status output 94b to transmit a logic high signal. Then the redundancy controller 94, having declared its respective supply 68 a master supply, changes its respective master-present I/O 94a from being a high impedance input to a low impedance output, and sets the I/O 94a to a logic high, maintaining the master-not-present signal. The respective master-present transmit circuit 96 detects on its control input 96c that the local master/slave status output 94b is set to master (high) and on its input 96a that the master-present I/O 94a is being driven high as a master-not-present signal, and responds by causing its output 96b to pull the common master-present bus 100 low, as a master-present signal.

Once a master supply is declared and the common master-present bus is being pulled low, each of the other redundant supplies 68, which have not yet declared themselves master become slave supplies. Specifically, the respective master-present sense circuit 98 transmits the low, master-present signal of the common master-present bus 100 to the master-present input/output 94a of the respective redundancy controller 94. All of redundant supplies 68 with controllers 94 that have master-present input/output 94a set as an high impedance input detect the master-present (low) signal and do not try to become masters supplies.

The redundancy controller 94 of the master supply continues to hold the common master-present bus 100 low as a master-present signal, since the controller 94 is actively overriding the signal from the master-present sense circuit 98. If the power section 72 of this master redundant supply 68 fails, the respective redundancy controller 94 and arbitration circuit 82 will release the common master-present bus 100, allowing the common master-present bus 100 to be pulled high as a master-not-present signal. The remaining slave supplies in the power system 66 will go through an arbitration process to determine which redundant supply 68 will become the new master supply.

FIG. 11 shows a circuit which includes an example of an embodiment of the arbitration circuit 82 (see FIG. 10B) of the redundant power supply 68 according to the present invention. Specifically, the master/slave status output of the redundancy microcontroller is connected to FET Q25 and the local master-present I/O of the redundancy controller is connected to FET Q26.

At initialization, controlled switch U5 starts in the off state. The regulated bias of each power supply is pulling the common master-present bus high via its respective resistor R19. This master-not-present signal voltage is fed through voltage divider resistors R20 and R21 to turn on FET Q27. When FET Q27 is on, controlled switch U6 turns off, and the local master-present signal goes high, turning FET Q26 on.

The first redundancy controller to detect that the common master-present bus signal is high, i.e. a master-not-present signal, declares itself to be a master, and sets its respective local master/slave status to master. The master redundancy controller also changes its local master-present signal from being a high impedance input to a low impedance output, and sets it high, latching FET Q26 on. This turns FET Q25 on, and because FET Q26 is on, controlled switch U5 is turned on. Controlled switch U5 pulls the common master-present bus low, turning FET Q27 off, and allowing controlled switch U6 to turn on, pulling the local master-present low as a master-present signal on all of the arbitration circuits connected to the common master-present bus.

All of the redundancy controllers still set as slaves see that their respective local master-present is low and do not try to become masters. The master supply, since it is actively overriding the signal from controlled switch U6, continues to hold the common master-present bus low. If the master supply fails or is otherwise shut down, it will release the common master-present bus, and the remaining slaves, if any, will go through an arbitration to determine which power supply will be the new master.

Referring again to FIGS. 9 and 10B, the synchronization circuit 84 in each redundant supply 68 provides two functions. First, the synchronization circuit 84 in a master supply will define when the slave supplies will begin a new AC output cycle by providing a common master-polarity signal to a common polarity bus 102 of the redundancy bus 78. Second, the synchronization circuit 84 provides supplemental arbitration in the event that multiple master supplies exist simultaneously due to the arbitration circuits 82 of two or more redundant supplies 68 in the power system 66 each declaring their respective-redundant supply 68 as a master supply. Synchronization logic for implementing the functions of the synchronization circuit 84 is embodied in both the synchronization circuit 84 itself and in the redundancy controller 94.

Each synchronization circuit 84 comprises a synchronization transmit circuit 104 and a synchronization read circuit 106. The common polarity bus 102 connects the synchronization circuit 84 to the synchronization circuits 84 of the other redundant supplies 68 for communicating the common master-polarity signal.

Specifically, regarding the synchronization circuit 84 of each redundant supply 68, a local master-polarity output 94c of the redundancy controller 94 is connected to an input 104a of the synchronization transmit circuit 104. An output 104b of the synchronization transmit circuit 104 is connected to the polarity bus 102 through a resistance. Further, the master/slave status output 94b is connected to a control input 104c of the synchronization transmit circuit 104.

Further, the common polarity bus 102 is connected to an input 106a of the synchronization read circuit 106. An output 106b of the synchronization read circuit 106 is connected to a polarity-average input 94d of the redundancy controller 94.

The operation of the synchronization circuits 82 connected to the common polarity bus 102 in the redundant power system 66 of the present invention is as follows.

If a redundant supply 68 has been declared to be a master supply, then the synchronization transmit circuit 104 circuitry is activated by the local master/slave status (high) signal of the master supply that is transmitted to the control input 104c. This logic high at the control input 104c causes the synchronization transmit circuit 104 to transmit a local master-polarity signal from the local master-polarity output 94c of the redundancy controller 94 to the common polarity bus 102. A common master-polarity signal thus provided on the common polarity bus is an active logic high or low. The redundancy controller 94 generates the local master-polarity signal at the local master-polarity output 94c based on a connection of the controller 94 to a polarity control or switch of the power section 72 in the master supply.

In each slave supply, the synchronization transmit circuit 104 circuitry is disabled by the local master/slave status (low) signal of the master supply that is transmitted to the control input 104c. This logic low at the control input 104c causes the output 104a of the synchronization transmit circuit 104 to become high impedance.

The common master-polarity signal of a master supplies transmitted to the common polarity bus 102 defines the polarity of the AC waveform generated by the power sections 72 of all the redundant supplies 68 in the power system 66. That is, when the common master-polarity signal is a logic high, the voltage at the AC output is positive, and when the common master-polarity signal is a logic low, the voltage at the AC output is negative.

The respective redundancy controller 94 of each of the redundant supplies 68 in the power system 66, whether master or slave, reads the value of the common polarity bus from its respective synchronization read circuit 106, and sets the voltage of its AC output accordingly by controlling the polarity switch of the respective power section 72. Thus, voltages having matching polarities are transmitted by the AC outputs of each of the redundant supplies 68 to common AC output bus 76.

As an example, if the power supply 10 described herein is used in the power section 72, the microcontroller polarity switch of the polarity circuit 46 of FIG. 3B would be connected to the redundancy controller 94. In this example, if the power supply 10 was in a master supply, the polarity switch would be monitored by the redundancy controller 94 to generate the local master-polarity signal at the local master-polarity output 94c. Further, if the power supply 10 was in a slave supply, the polarity switch would be controlled by the redundancy controller 94 according to the common master-polarity signal at the polarity-average input 94d.

Referring again to FIGS. 9 and 10C, regarding the above-mentioned supplemental arbitration function of the synchronization circuits 84, if there are two or more master supplies in the power system 66, the common master-polarity signal on the common polarity bus 102 can have three possible values: a logic high, a logic low, and an ambiguous value representing neither high nor low. Specifically, at any given moment, the value of the common master-polarity signal read by each synchronization read circuit 106 in the power system 66 is an average of the values of all of synchronization transmit outputs 104b.

If only one master supply is present in the power system 66, the high impedance synchronization transmit circuits 104 of each the slave supplies do not substantially affect the average and the one master supply controls the common master-polarity signal.

However, if two or more master supplies are present in the power system 66, each of the master supplies' respective synchronization transmit circuit 104 has an averaging effect on the common master-polarity signal. When all of the master supplies agree on the polarity such that the logic level of their respective local master-polarity signals match at a given moment, then the common master-polarity signal on the common polarity bus 102 will be a logic high or logic low as the consensus determines. When at least one of the master supplies disagrees with the others such that the logic levels of all of the master supplies' respective local. master-polarity signals do not match at a given moment, then the common master-polarity signal on the common polarity bus 102 will be an ambiguous logic level derived from the average voltage of the logic levels of all of the master supplies. This will provide an ambiguous polarity state to the remaining slaves.

Specifically, the synchronization read circuit 106 of each redundant supply 68 comprises a differential amplifier which transmits the common master-polarity signal as a polarity-average signal to the polarity-average input 94d of the redundancy controller 94. An analog-to-digital converter in the redundancy controller 94 samples the polarity-average input 94d and determines the correct polarity state based upon the polarity-average signal.

When the respective redundant supply 68 is a master supply, then the redundancy controller compares the sampled voltage from the polarity-average input 94d to the voltage the controller 94 is placing on the local master-polarity output 94c for the local master-polarity signal. If the logic levels of the polarity-average input 94d and the local master-polarity output 94c do not match or are dissimilar, then the redundancy controller 94 of the respective master supply determines that more the one master supply is present in the power system 66 and changes the respective redundant supply 68 to a slave supply. Each of the master supplies in the power system 66 that detects an ambiguous polarity-average signal will become a slave supply. If no master supply remains, the arbitration circuits 82 will operate to declare a new master supply.

FIG. 11 shows a circuit which includes an example of an embodiment of the synchronization circuit 84 (see FIG. 10B) of the redundant power supply 68 according to the present invention. If the respective power supply is declared to be a master, then master-slave status will turn FET Q28 is turned on, which turns controlled switch U7 on. Controlled switch U7 provides power to optocoupler U8. If the respective power supply is a slave, optocoupler U8 is unpowered, and is a high impedance output.

If optocoupler U8 is powered, it sends an active high or low to the common polarity bus via resistor R22. The common polarity bus defines the polarity of the AC waveform generated by all the redundant power supplies. If the output of optocoupler U8 is high, the AC output voltage is positive, and if the output of optocoupler U8 is low, the AC output voltage is negative.

However, if there are two or more masters in the system, the common polarity bus can have three states. If the masters agree on the common polarity bus voltage, then the common polarity bus will be high or low as determined by the consensus. However, if the masters disagree, then the common polarity bus voltage will be the average of the voltages the masters are putting out.

Disagreement between multiple master will provide an ambiguous polarity state to any slaves. A differential amplifier U9 provides the common polarity bus signal to the polarity-average input of the redundancy controller. The A/D converter of each slave supply's redundancy controller samples the polarity-average signal and decides the correct polarity state based on this information.

The redundancy controller of a master power supply compares the polarity-average signal voltage to the voltage it is putting onto the its local master-polarity output as a local master-polarity signal. If the two signals do not agree, the redundancy controller of the master supply knows that an arbitration situation is occurring, and acts to resolve it. Generally, this is achieved by having all masters putting out either a "1" or a "0" become slaves. This resolves the ambiguity. This process continues, eliminating ambiguous polarity signals, until there is only one master controlling the common polarity bus, and all other redundant power supplies are slaves.

Referring now to FIGS. 9 and 10C, the soft-start circuit in each redundant power supply 68 is connected to a start-ready bus 108 of the redundancy bus 78, so that two or more redundant power supplies 68 in the redundancy circuit 66 can start producing a voltage at their AC outputs in synchronization. The soft-start circuit delays the AC output of each of the power sections 72 until all of the operating power supplies 68 have completed initialization or a start-up cycle and are ready to begin outputting to the common AC output bus 76.

Specifically, each soft-start circuit 86 comprises a start relay 110 and a soft-start relay latch circuit 112. The start relay 110 has normally-closed relay contacts connected between the start-ready bus 108 and the local bias return (ground) 93. The start relay 110 has its coil connected to an output shutdown signal of the power section 72. The output shutdown signal stays low until the power section 72 has completed initialization. An example of an output shutdown signal is described herein with reference to the power supply 10 as shown in FIG. 3B.

Further, still referring to FIGS. 9 and 10C, the relay latch circuit 112 of the soft-start circuit 86 has a trigger input 112a connected to the start-ready bus 108 and a soft-start output 112b of the relay latch communicates with the power section 72 to indicate to the power section 72 when to begin outputting to the common AC output bus 76.

Before the initialization of each redundant supply 68, the respective start relay 110 begins with its coil de-energized, thereby shorting the start-ready bus 108 to the local bias return (ground) 93 through the relay contacts of the start relay 110. The relay latch circuit 112 reads the status of the start-ready bus 108, being shorted to ground, and stays low. Further, the respective start relays 110 of each of the other redundant supplies 68 in the power system 66 are shorted to ground through the start-ready bus 108, preventing the units from starting their respective AC outputs.

Further, during initialization of the power section 72 of each redundant supply 68, the output shutdown signal is low, keeping the coil of the start relay 110 off and keeping the start-ready bus 108 shorted to ground. When the power section 72 has completed initializing and is ready to start its respective AC output, it sets output shutdown signal high. This energizes the coil of the start relay 110 causing the contacts to open. Thus, once all of the power sections 72 in the power system 66 have completed initializing, none of the start relays remain shorting the start-ready bus 108 to ground. The relay latch trigger input 112a of each redundant supply 68 reads the open state of the start-ready bus 108 and responds by latching open the contacts of the start relay 110 and releasing the soft-start output 112b which allows the respective power sections to start their AC outputs in synchronization.

Once the redundant supplies 68 have begun delivering power to the common AC output bus 76, if one or more of the power sections 72 fail or are otherwise shut down, the respective output shutdown signal goes low which shuts the power section 72 off, resets respective the soft-start output 112b, and de-energizes the respective start relay 110. Since the start relays 110 of each of the other redundant supplies 68 have been latched open by their respective relay latches 112, the other redundant units do not shut down, despite the start-ready bus 108 being shorted to ground. In other words, the relay latch 112 does not read the start-ready bus 108 after startup. The relay latch 112 is only cleared after all power is removed from the respective supply 68.

Figure 12:
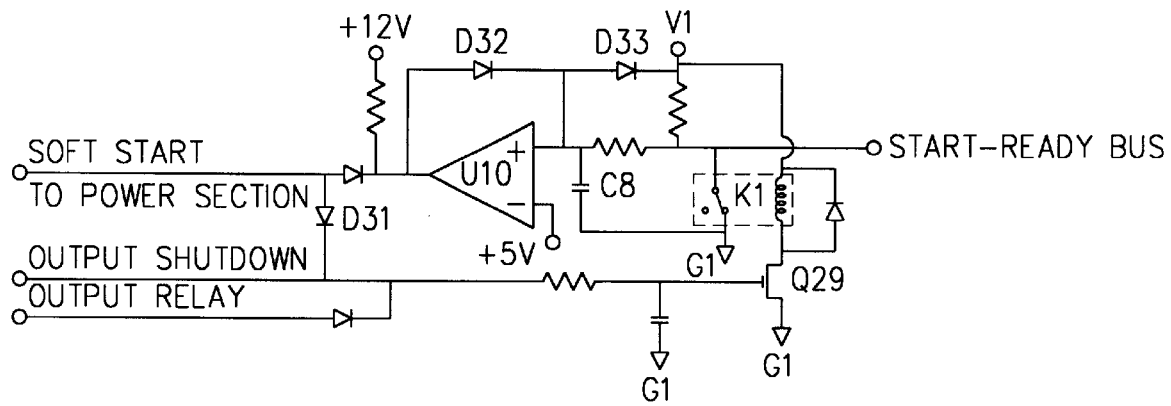
FIG. 12 shows a schematic diagram of an embodiment of the soft-start circuit of FIG. 10C.

FIG. 12 shows an example of an embodiment of the soft-start circuit 86 (see FIG. 10C) of the redundant power supply 68 according to the present invention. The soft-start circuit begins with a coil of a soft-start relay K1 de-energized causing the contacts of the soft-start relay K1 to short the start-ready bus to the local power supply ground G1. While each of the redundant power supplies are initializing, a non-inverting input of a soft-start differential amplifier U10 is held to 0 volts, and an output of the soft-start differential amplifier U10 is low. This low output pulls each redundant power supply's soft-start to the respective local power supply ground G1, preventing the power supply from starting up.

Further, while initializing, the output shutdown signal in each power supply is low, keeping coil of the soft-start relay K1 off and also holding the soft-start output off though a pull-down diode D31. Once the respective power supply has completed initializing, it sets the output shutdown high, turning FET Q29 on. FET Q29 thus energizes the coil of the soft-start relay K1 causing the contacts of the relay K1 to open.

Once the respective soft-start relays K1 of all of the redundant power supplies have been energized K1 the start-ready bus goes open. With the start-ready bus open, a soft-start capacitor C8 in each power supply begins charging, providing a delay until the capacitor C8 causes the output of the respective soft-start differential amplifier U10 to go high.

Once the output of the amplifier U10 goes high, a soft-start latching diode D32 causes the respective soft-start differential amplifier U10 to latch on. The latched output of the amplifier U10 releases the respective soft-start, and all units begin to start their outputs in synchronization.

If a power supply must subsequently be shut down, the respective output shutdown goes low, shutting the unit off, resetting the soft-start, and de-energizing the soft-start relay K1. The latching of the soft-start differential amplifier U10 prevents the other power supplies from shutting down.

The soft-start circuit receives bias voltage from a local bias V2 of the respective power supply, rather than via the common bias bus. Thus, a reset diode D33 disengages the latching of the soft-start differential amplifier U10 when the local bias V2 is lost.

Referring now to FIGS. 9 and 10C, the overvoltage correction circuit 88 is provided to detect an overvoltage on the common AC output bus 76 and to identify which redundant power supply 68 in the redundant power system 68 is creating the overvoltage. The overvoltage correction circuit 88 comprises an overvoltage detect circuit 114, a duty-cycle detect circuit 116 and a overvoltage latch circuit 118.

The overvoltage detect circuit 114 is connected to the AC output of the respective power section 72 for sensing the voltage on the common AC output bus 76. The duty-cycle detect circuit 116 is connected to sense the signal from the PWM, or "PWM signal", used to generate the AC output of the power section 72. An example of a PWM signal is the signal generated by the PWM 44 to control the amplitude circuit 41, as described herein with reference to FIGS. 3A and 4.

Still referring to FIGS. 9 and 10C, the overvoltage detect circuit 114 reads the peak output voltage on the common AC output bus 76. If peak output voltage is higher than a predetermined value, the overvoltage detect circuit 114 sends an overvoltage signal to the overvoltage latch circuit 118.

The duty-cycle detect circuit 116 senses the duty-cycle of the PWM signal of the respective power section 72. If the PWM signal is at or near a predetermined maximum duty-cycle, the duty-cycle detect circuit 116 sends a maximum-duty-cycle signal to the overvoltage latch circuit 118.

The overvoltage latch circuit 118 is connected to shutdown its respective power section 72 if the power section 72 is the cause of an overvoltage on the common AC output bus 76. If the overvoltage latch circuit 118 simultaneously receives signals from both the overvoltage detect circuit 114 and the duty-cycle detect circuit 116, then the latch circuit 118 will shut the power section 72 down and hold it off via the output shutdown signal.

All of the overvoltage detect circuits 114 in the power system 66 will sense an overvoltage on the common AC output bus 76. However, only the redundant supply 68 which causes the overvoltage will be at maximum duty-cycle and thus be shut down by the overvoltage latch 118. The other units will be at a minimum duty-cycle and thus their latches 118 will not be triggered.

Figure 13:
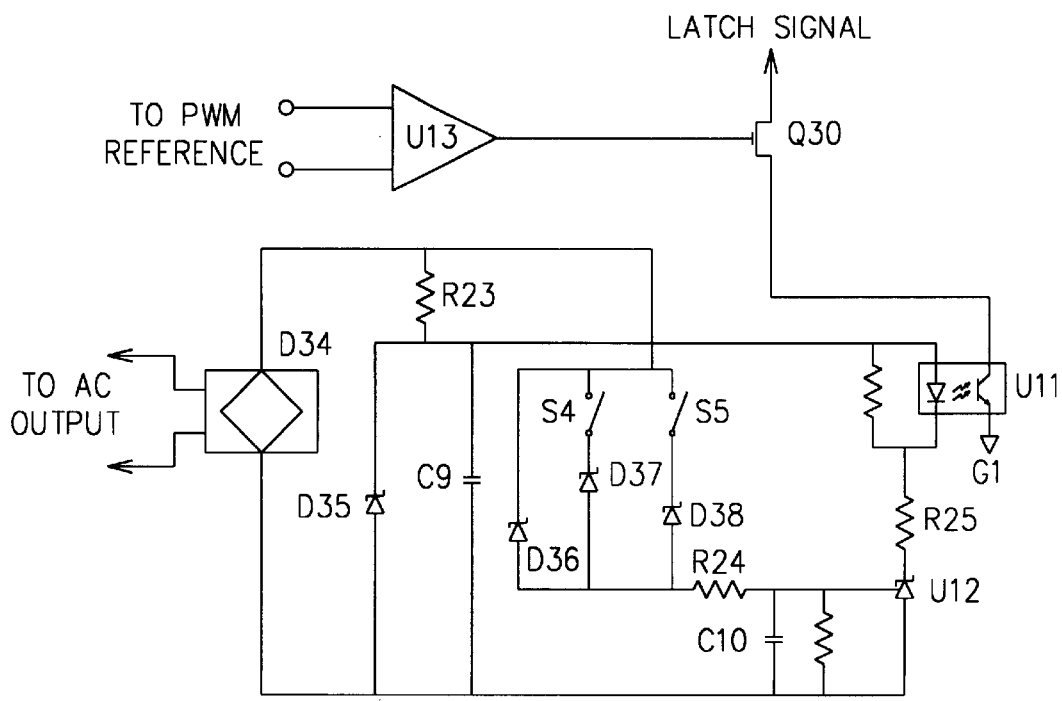
FIG. 13 shows a schematic diagram of an embodiment of the overvoltage correction circuit of FIG. 10C.

FIG. 13 shows an example of an embodiment of the overvoltage correction circuit 88 (see FIG. 10C) of the redundant power supply 68 according to the present invention. Specifically, the overvoltage detect circuit is connected to the AC output of the respective power supply. A diode bridge D34 rectifies the signal from the AC output. A resistor R23, a capacitor C9 and a zener diode D35 provide a bias voltage to an optocoupler U11 and a shunt regulator U12. When rectified AC output voltage rises higher than the breakdown voltage of a zener diode D36, the zener diode D36 conducts current through a resistor R24 to charge a capacitor C10. When the capacitor C10 reaches the threshold of the shunt regulator U12, current conducts through the optocoupler U11, a resistor R25 and the shunt regulator U12. This current turns on the optocoupler U1.

In the duty-cycle detect circuit, a comparator U13 connected to the PWM and a reference voltage of the respective power supply is used to detect a maximum duty-cycle of power supply. When the maximum duty-cycle is reached, the comparator U13 turns on the FET Q30. If an overvoltage occurs while the FET Q30 is turned on, the FET Q30 and the optocoupler U11 will be simultaneously turned on, shorting the latch signal to the local ground G1, in order to shut down and hold off the power supply.

Two switches S4 and S5 are used to selectively switch two zener diodes D37 and D38, respectively, into the circuit. These diodes D37,D38 have lower breakdown voltages than the other zener diode D36, and are used to set the overvoltage threshold or maximum peak voltage level to a lower value, when desired.

The present disclosure describes several embodiments of the invention, however, the invention is not limited to these embodiments. Other variations are contemplated to be within the spirit and scope of the invention and appended claims.

What is claimed is:

1. A power supply for operation in a redundant power system, the power supply comprising:
   a power section comprising a power output for sharing a load with at least one other power supply;
   a redundant circuit controlling the power section for cooperation with a corresponding redundant circuit of the at least one other power supply, the redundant circuit operating as determined by a local master/slave status as one of a master and a slave;
   a common master-present connection for connection to a corresponding common master-present connection of the at least one other power supply; and
   arbitration logic in communication with the common master-present connection, wherein if the arbitration logic senses a master-not-present signal at the common master-present connection, then the arbitration logic sets the local master/slave status to master and transmits a master-present signal to the common master-present connection, and wherein if the arbitration logic senses a master-present signal at the common master-present connection and the local master/slave status is not set to master, then the arbitration logic sets the local master/slave status to slave.

2. The power supply according to claim 1, wherein the arbitration logic comprises:
   a master-present sense circuit for sensing a signal at the common master-present connection;
   a master-present transmit circuit for transmitting a signal to the common master-present connection; and
   a redundancy controller comprising a master-present input/output connected to both the master-present sense circuit and the master-present transmit circuit, the redundancy controller setting the local master/slave status, wherein the redundancy controller sets the master-present input/output to operate as an output when the local master/slave status is set to master, and wherein the redundancy controller sets the master-present input/output to operate as an input when the local master/slave status is set to slave.

3. The power supply according to claim 1, further comprising a common polarity connection for connection to a corresponding common polarity connection of the at least one other power supply; and wherein the redundant circuit comprises a synchronization circuit which reads a polarity value at the common polarity connection, wherein if the local master/slave status is set to master then the synchronization circuit transmits a master polarity signal to the common polarity connection and the arbitration logic compares the master-polarity signal to the polarity value and upon detecting a dissimilarity sets the local master/slave status to slave.

4. The power supply according to claim 1, further comprising:
   a common bias connection for connection to a corresponding common bias connection of the at least one other power supply; and a redundant bias circuit for contributing to a common bias voltage at said common bias connection, the redundant bias circuit providing operating power to the redundant circuit;

wherein the redundant bias circuit is adapted to provide the operating power to the redundant circuit from a local bias voltage and to alternatively provide the operating power to the redundant circuit from the common bias connection when the local bias voltage is unavailable.

5. A redundant power system comprising:

a plurality of power supplies each connected to a common master-present bus and a common AC output bus;

each of the plurality of power supplies comprising:
an AC output connected to the common AC output bus;
a redundant circuit for redundantly operating the power supply in cooperation with the respective redundant circuits of each of the other power supplies, the redundant circuit operating as determined by a local master/slave status as one of a master and a slave; and arbitration logic in communication with the common master-present bus, wherein if the arbitration logic senses a master-not-present signal on the common master-present bus, then the arbitration logic sets the local master/slave status to master and transmits a master-present signal to the common master-present bus node, and wherein if the arbitration logic senses a master-present signal on the master bus and the local master/slave status is not set to master, then the arbitration logic sets the local master/slave status to slave.

6. A power supply for operation in a redundant power system, the power supply comprising:

a power section comprising an AC output and a polarity circuit connected to control polarity of a voltage at the AC output;

a synchronization circuit for synchronizing the polarity circuit with a polarity circuit of at least one other power supply;

an amplitude circuit connected to control amplitude of the voltage at the AC output; and a controller connected to operate the amplitude circuit and the polarity circuit so as to obtain a desired waveform at the AC output.

7. The power supply according to claim 6 further comprising:

a common bias connection for connection to a corresponding common bias connection of the at least one other power supply; and a redundant bias circuit for contributing to a common bias voltage at said common bias connection, the redundant bias circuit providing operating power to the synchronization circuit;

wherein the redundant bias circuit is adapted to provide the operating power to the synchronization circuit from a local bias voltage and to alternatively provide the operating power to the synchronization circuit from the common bias connection when the local bias voltage is unavailable.

8. The power supply according to claim 6, wherein the power section further comprises a start-up cycle, the power supply further comprising:

a start-ready connection for connection to a corresponding start-ready connection of the at least one other power supply; and a soft-start circuit for transmitting a not-ready signal to the start-ready connection until the start-up cycle has completed, wherein the soft-start circuit disrupts the operation of the AC output until the soft-start circuit senses no not-ready signal at the start-ready connection.

9. The power supply according to claim 6, wherein the power section further comprises a pulse-width modulation signal and the AC output is adapted for connection to a corresponding AC output of the at least one other power supply, the power supply further comprising:

an overvoltage detection circuit sensing a peak voltage level of the AC output, wherein the overvoltage detection circuit transmits an overvoltage signal if the peak voltage level exceeds a predetermined peak voltage level;

a duty-cycle detection circuit sensing a duty cycle level of the pulse-width modulation signal, wherein the duty-cycle detection circuit transmits a maximum-duty-cycle signal when the duty-cycle level of the pulse-width modulation signal exceeds a predetermined maximum duty-cycle level; and an overvoltage correction circuit in communication with the overvoltage detection circuit and in communication with the duty-cycle detection circuit, wherein the overvoltage latch circuit disrupts the operation of the AC output when the overvoltage correction circuit simultaneously detects both the overvoltage signal and the maximum-duty-cycle signal.

10. The power supply according to claim 9, wherein the overvoltage correction circuit comprises an overvoltage latch that continues to disrupt the operation of the AC output after the overvoltage signal and the maximum-duty-cycle signal are no longer detected by the overvoltage correction circuit.

11. A power supply for operation in a redundant power system, the power supply comprising:

a local master/slave status settable to one of master and slave;

a common polarity connection for connection to a corresponding common polarity connection of at least one other power supply;

synchronization logic which reads a polarity value at the common polarity connection, and if the local master/slave status is set to master, then the synchronization logic transmits a master polarity signal to the common polarity connection; and a power section comprising an AC output and a polarity control connected to the synchronization logic for setting a polarity of the AC output according to the polarity value at the common polarity connection, the polarity control being connected to the synchronization logic for providing the master polarity signal to the synchronization logic.

12. The power supply according to claim 11, wherein the synchronization logic comprises:

a synchronization read circuit comprising a synchronization read input connected to the common polarity connection for reading the polarity value, the synchronization read circuit further comprising a synchronization read output for transmitting the polarity value;

a redundancy controller being connected to the polarity circuit of the power section, the redundancy controller comprising a local master-polarity output for transmitting the master polarity signal from the polarity circuit of the power section, the redundancy controller further comprising a polarity-average input connected to the synchronization read output, the redundancy controller further comprising a local master/slave status output for transmitting the local master/slave status, wherein the local master-slave status is set be the redundancy controller; and a synchronization transmit circuit comprising a synchronization transmit input connected to the local master-popularity output, the synchronization circuit further comprising a synchronization transmit control input connected to the local master/slave status output of the redundancy controller for controlling the operation of the synchronization transmit circuit, the synchronization transmit circuit further comprising a synchronization transmit output for transmitting the master polarity signal to the common polarity connection.

13. The power supply according to claim 11, further comprising:

a common bias connection for connection to a corresponding common bias connection of the least one other power supply; and a redundant bias circuit for contributing to a common bias voltage at said common said common bias connection, the redundant bias circuit providing operating power to the polarity logic;

wherein the redundant bias circuit is adapted to provide the operating power to the polarity logic from a local bias voltage and to alternatively provide the operating power to the polarity logic from the common bias connection when the local bias voltage is unavailable.

14. The power supply according to claim 11, wherein the power section further comprises a start-up cycle, the power supply further comprising:

a start-ready connection for connection to a corresponding start-ready connection of at the least one other power supply; and a soft-start circuit for transmitting a not-ready signal to the start-ready connection until the start-up cycle has completed, wherein the soft-start circuit disrupts the operation of the AC output until the soft-start circuit senses no not-ready signal at the start-ready connection.

15. The power supply according to claim 11, wherein the power section further comprises a pulse-width modulation signal and the AC output is adapted for connection to a corresponding AC output of the at least one other power supply, the power supply further comprising:

an overvoltage detection circuit sensing a peak voltage level of the AC output, wherein the overvoltage detection circuit transmits an overvoltage signal if the peak voltage level exceeds a predetermined peak voltage level;

a duty-cycle detection circuit sensing a duty cycle level of the pulse-width modulation signal, wherein the duty-cycle detection circuit transmits a maximum-duty-cycle signal when the duty-cycle level of the pulse-width modulation signal exceeds a predetermined maximum duty-cycle level; and an overvoltage correction circuit in communication with the overvoltage detection circuit and in communication with the duty-cycle detection circuit, wherein the overvoltage correction circuit disrupts the operation of the AC output when the overvoltage correction circuit detects both the overvoltage signal and the maximum-duty-cycle signal.

16. The power supply according to claim 15, wherein the overvoltage correction circuit comprises an overvoltage latch that continues to disrupt the operation of the AC output after the overvoltage signal and the maximum-duty-cycle signal are no longer detected by the overvoltage correction circuit.

17. A redundant power system comprising a plurality of power supplies each connected to a common polarity bus, each of the plurality of power supplies comprising:

a local master/slave status settable to one of master and slave;

a synchronization circuit which reads a polarity value from the common polarity bus and if the local master/slave status is set to master, then the synchronization circuit transmits a master polarity signal to the common polarity bus; and a power section comprising an AC output and a polarity control connected to set the polarity of the AC output according to the polarity value of the common polarity bus.

18. A power supply for operation in a redundant power system, the power supply comprising:

a redundant circuit for cooperation with a corresponding redundant circuit of at least one other power supply;

a power section for providing a local bias voltage;

a common bias connection for connection to a corresponding common bias connection of the at least one other power supply; and a redundant bias circuit for contributing to a common bias voltage at said common bias connection, the redundant bias circuit providing operating power to the redundant circuit;

wherein the redundant bias circuit is adapted to provide the operating power to the redundant circuit from the local bias voltage and to alternatively provide the operating power to the redundant circuit from the common bias connection when the local bias voltage is unavailable.

19. The power supply according to claim 18, wherein the redundant bias circuit further comprises a redundant bias regulator connected between the common bias connection and redundant circuit to provide the operating power as a regulated voltage.

20. The power supply according to claim 19, wherein the redundant bias circuit further comprises a bias clamp circuit connected between the redundant bias regulator and the common bias connection to protect the redundant bias regulator from excessive voltages.

21. The power supply according to claim 18, wherein the power section further comprises a power section comprising a local bias connection for providing the local bias voltage, and the power supply further comprising a bias diode connected between the local bias connection and the common bias connection for performing a logical OR operation of the local bias voltage onto the common bias connection.

22. A redundant power system comprising a plurality of power supplies each connected to a common bias bus, each of the plurality of power supplies comprising:

a redundant circuit for cooperation with a corresponding redundant circuit of each of the other power supplies;

a power section for providing a local bias voltage;

a redundant bias circuit for contributing to a common bias voltage at the common bias bus, the redundant bias circuit providing operating power to the redundant circuit; and a bias diode for performing a logical OR operation of the local bias voltage onto the common bias connection;

wherein the redundant bias circuit is adapted to provide the operating power to the redundant circuit from the local bias voltage and to alternatively provide the operating power to the redundant circuit from the common bias connection when the local bias voltage is unavailable.

23. A power supply for operation in a redundant power system, the power supply comprising:

a power section comprising an AC output and a start-up cycle;

a start-ready connection for connection to a corresponding start-ready connection of at least one other power supply; and a soft-start circuit for transmitting a not-ready signal to the start-ready connection until the start-up cycle has completed, wherein the soft-start circuit disrupts the operation of the AC output until the soft-start circuit senses no not-ready signal at the start-ready connection.

24. The power supply of claim 23, wherein the not-ready signal comprises shorting of the start-ready connection to a ground reference.

25. The power supply of claim 23, wherein the soft-start circuit further comprises a start relay comprising relay contacts connected between the start-ready connection and a source of the not-ready signal.

26. The power supply of claim 23, wherein the soft-start circuit further comprises a soft-start latch which prevents subsequent disruption of the AC output by the soft-start circuit after the soft-start circuit senses no not-ready signal at the start-ready connection.

27. The power supply of claim 23, wherein the power section further comprises a pulse-width modulation signal and wherein the AC output for connection to a corresponding AC output of the at least one other power supply, the power supply further comprising:

an overvoltage detection circuit sensing a peak voltage level of the AC output, wherein the overvoltage detection circuit transmits an overvoltage signal if the peak voltage level exceeds a predetermined peak voltage level;

a duty-cycle detection circuit sensing a duty cycle level of the pulse-width modulation signal, wherein the duty-cycle detection circuit transmits a maximum-duty-cycle signal when the duty-cycle level of the pulse-width modulation signal exceeds a predetermined maximum duty-cycle level; and an overvoltage correction circuit in communication with the overvoltage detection circuit and in communication with the duty-cycle detection circuit, wherein the overvoltage correction circuit disrupts the operation of the AC output when the overvoltage correction circuit detects both the overvoltage signal and the maximum-duty-cycle signal.

28. A power supply comprising:

a power section comprising a pulse-width modulation signal and an AC output for connection to a corresponding AC output of at least one other power supply;

an overvoltage detection circuit sensing a peak voltage level of the AC output, wherein the overvoltage detection circuit transmits an overvoltage signal if the peak voltage level exceeds a predetermined peak voltage level;

a duty-cycle detection circuit sensing a duty cycle level of the pulse-width modulation signal, wherein the duty-cycle detection circuit transmits a maximum-duty-cycle signal when the duty-cycle level of the pulse-width modulation signal exceeds a predetermined maximum duty-cycle level; and an overvoltage correction circuit in communication with the overvoltage detection circuit and in communication with the duty-cycle detection circuit, wherein the overvoltage correction circuit disrupts the operation of the AC output when the overvoltage correction circuit detects both the overvoltage signal and the maximum-duty-cycle signal.

29. The power supply of claim 28, wherein the overvoltage correction circuit comprises a overvoltage latch that continues to disrupt the operation of the AC output after the overvoltage signal and the maximum-duty-cycle signal are no longer detected by the overvoltage correction circuit.

30. The power supply of claim 28, wherein the overvoltage detection circuit comprises a rectifier connected to the AC output.

* * * * *

UNITED STATES PATENT AND TRADEMARK OFFICE
CERTIFICATE OF CORRECTION

PATENT NO. : 6,493,243 B1
DATED : December 10, 2002
INVENTOR(S) : Richmond Andrew Real It is certified that error appears in the above-identified patent and that said Letters Patent is hereby corrected as shown below:

Column 4,
Line 7, please delete ":" (colon).

Column 5,
Line 47, please delete "." (period).

Column 8,
Line 4, please delete "-" (hyphen).

Column 21,
Line 47, please delete "claim 6 further", and insert therefor -- claim 6, further --.

Column 23,
Line 9, please delete "popularity", and insert therefor -- polarity --.

Signed and Sealed this

Third Day of June, 2003

JAMES E. ROGAN
*Director of the United States Patent and Trademark Office*